United States Patent
Castelaz et al.

(10) Patent No.: US 10,457,159 B1
(45) Date of Patent: Oct. 29, 2019

(54) POWER SHARE CONVERTER FOR CONNECTING MULTIPLE ENERGY STORAGE SYSTEMS

(71) Applicant: Motiv Power Systems, Inc., Foster City, CA (US)

(72) Inventors: Jim Michael Castelaz, Alameda, CA (US); Elias Stein, San Francisco, CA (US); William Treichler, San Francisco, CA (US)

(73) Assignee: Motiv Power Systems, Inc., Foster City, CA (US)

(*) Notice: Subject to any disclaimer, the term of this patent is extended or adjusted under 35 U.S.C. 154(b) by 268 days.

(21) Appl. No.: 15/250,906

(22) Filed: Aug. 29, 2016

Related U.S. Application Data

(66) Continuation-in-part of application No. 14/231,728, filed on Mar. 31, 2014, now Pat. No. 9,568,930.
(Continued)

(51) Int. Cl.
| | | |
|---|---|---|
| *H02J 1/10* | (2006.01) | |
| *H02J 3/06* | (2006.01) | |
| *H02J 3/46* | (2006.01) | |
| *B60L 53/22* | (2019.01) | |
| *H02P 27/06* | (2006.01) | |
| *H02P 29/66* | (2016.01) | |
| *B60L 1/02* | (2006.01) | |

(52) U.S. Cl.
CPC .............. *B60L 53/22* (2019.02); *H02P 27/06* (2013.01); *H02P 29/66* (2016.02); *B60L 1/02* (2013.01); *B60L 2210/10* (2013.01)

(58) Field of Classification Search
CPC .. H02J 4/00; H02J 1/102; G05B 15/02; G05F 1/66; Y02T 10/7072; Y02T 10/7005; Y02T 90/163; Y02T 90/14; Y02T 90/128; Y04S 10/126; Y02E 60/721; Y10T 307/406; Y10T 307/359; Y10T 307/511; Y10T 307/50; Y10T 307/516; Y10T 307/32; B60L 11/1842
USPC ........................................................... 307/25
See application file for complete search history.

(56) References Cited

U.S. PATENT DOCUMENTS

| | | | |
|---|---|---|---|
| 2010/0133912 A1* | 6/2010 | King ...................... | B60L 1/003 307/82 |
| 2011/0133556 A1* | 6/2011 | Choi ....................... | H02J 3/383 307/65 |
| 2016/0052417 A1* | 2/2016 | Zhou ..................... | B60L 11/005 701/22 |

* cited by examiner

*Primary Examiner* — Rexford N Barnie
*Assistant Examiner* — Toan T Vu
(74) *Attorney, Agent, or Firm* — Imperium Patent Works; Amir V. Adibi; Andrew C. Palmer

(57) ABSTRACT

A system comprises a plurality of power converters, a plurality of energy storage systems, a first common node, a second common node, and zero-reference voltage node. Each power converter is coupled between one energy storage system and the first and second common nodes. The system operates to regulate power between the power converters and the first and second common nodes. Each power converter is a bi-directional power converter and each energy storage system is a battery pack. In one example, the first common node is regulated to a voltage VSPAN, and the second common node is regulated to a voltage VSCN which is the mean of all voltages output by the battery packs. In another example, the first common node is regulated to a voltage –VSPAN, and the second common node is regulated to a voltage +VSPAN. No power converter processes more than voltage VSPAN yielding high-efficiency power conversion.

26 Claims, 21 Drawing Sheets

(FIRST EMBODIMENT)

Related U.S. Application Data which is a continuation of application No. 12/908,816, filed on Oct. 20, 2010, now Pat. No. 8,698,351, Substitute for application No. 61/279,442, filed on Oct. 20, 2009.

(FIRST EMBODIMENT)

POWER CIRCUITRY OF POWER CONVERTER

CIRCUIT DIAGRAM OF POWER CONVERTER

APC WITH LOW VOLTAGE SWITCHING CIRCUIT (SECOND EMBODIMENT)

POWER CIRCUITRY OF FIRST-STAGE
CONVERTERS

POWER CIRCUITRY OF SECOND-
STAGE CONVERTER

POWER CIRCUITRY OF SECOND-
STAGE POWER CONVERTER (ALTERNATE EMBODIMENT)

ations, power outputs, and/or communication parameters. The custom-designed power electronics may be required to match the voltages and power levels of the new combination of interconnected power components. The custom-designed control circuitry may be required to coordinate the operation of the new combination of power components of the system. For example, in an electric vehicle, the desired amount of power provided to the power consumption component (e.g., the motor) may depend on the combination of power source components (e.g., batteries). If a new electric power consumption component or a new power source component is integrated into the system, new custom-designed power electronics and control circuitry may be required. This design process may be costly and may require a large amount of development and testing time.

POWER SHARE CONVERTER FOR CONNECTING MULTIPLE ENERGY STORAGE SYSTEMS

CROSS-REFERENCE TO RELATED APPLICATIONS

This application is a continuation-in-part of, and claims the benefit under 35 U.S.C. § 120 from, nonprovisional U.S. patent application Ser. No. 14/231,728, entitled "System And Method For Managing A Power System With Multiple Power Components", filed Mar. 31, 2014. U.S. patent application Ser. No. 14/231,728 is a continuation of, and claims the benefit under 35 U.S.C. § 120 from, nonprovisional U.S. patent application Ser. No. 12/908,816, entitled "System And Method For Managing A Power System With Multiple Power Components", filed Oct. 20, 2010. U.S. patent application Ser. No. 12/908,816 claims the benefit under 35 U.S.C. § 119 from provisional U.S. patent application Ser. No. 61/279,442, entitled "Networked Power Array", filed Oct. 20, 2009. The subject matter of each of the foregoing documents is expressly incorporated herein by reference.

TECHNICAL FIELD

This invention relates generally to the power system field, and more specifically to a new and useful system and method for managing a power system with multiple power components.

BACKGROUND

In conventional power systems with multiple power components (including power source components and power consumption components), the power systems include power electronics and control circuitry that function to manage the multiple power components. The power electronics may function to convert power between the power source components before use in the power consumption components and the control circuitry may function to communicate with each of the power components and to manage the power electronics. For example, electrical energy from a power source component (e.g., a battery or a generator) is typically converted from one voltage and current waveform to another by the power electronics and control circuitry before use in a power consumption component (e.g., a motor or any electrical load bearing device). In a more specific example, battery packs in an electric device such as an electric vehicle may provide direct current (DC) electrical power while the motor of the electric vehicle may require alternating current (AC). The power electronics may function to convert the DC electrical power into a varying-frequency AC electrical power to be used to power the motor of the electric vehicle.

In many applications, the power components within a system may be from different vendors. For example, a first battery pack may be sourced from a first vendor with a first set of operation parameters, power outputs, and/or communication parameters and a second battery pack may be sourced from a second vendor with a second set of operation parameters, power outputs, and/or communication parameters that are substantially different from the first set. Similarly, a motor may have substantially different power input parameters, operation parameters, and/or communication parameters from both the first battery pack and the second battery pack. The power electronics and control circuitry of conventional power systems are typically redesigned to accommodate for each new set of operation parameters, power outputs, and/or communication parameters. The custom-designed power electronics may be required to match the voltages and power levels of the new combination of interconnected power components. The custom-designed control circuitry may be required to coordinate the operation of the new combination of power components of the system. For example, in an electric vehicle, the desired amount of power provided to the power consumption component (e.g., the motor) may depend on the combination of power source components (e.g., batteries). If a new electric power consumption component or a new power source component is integrated into the system, new custom-designed power electronics and control circuitry may be required. This design process may be costly and may require a large amount of development and testing time.

Thus, there is a need in the multiple power component system field for a new and useful new and useful system and method for managing a power system with multiple power components.

DESCRIPTION OF THE PREFERRED EMBODIMENTS

The following description of the preferred embodiments of the invention is not intended to limit the invention to these preferred embodiments, but rather to enable any person skilled in the art to make and use this invention.

Overview

Figure 1A:
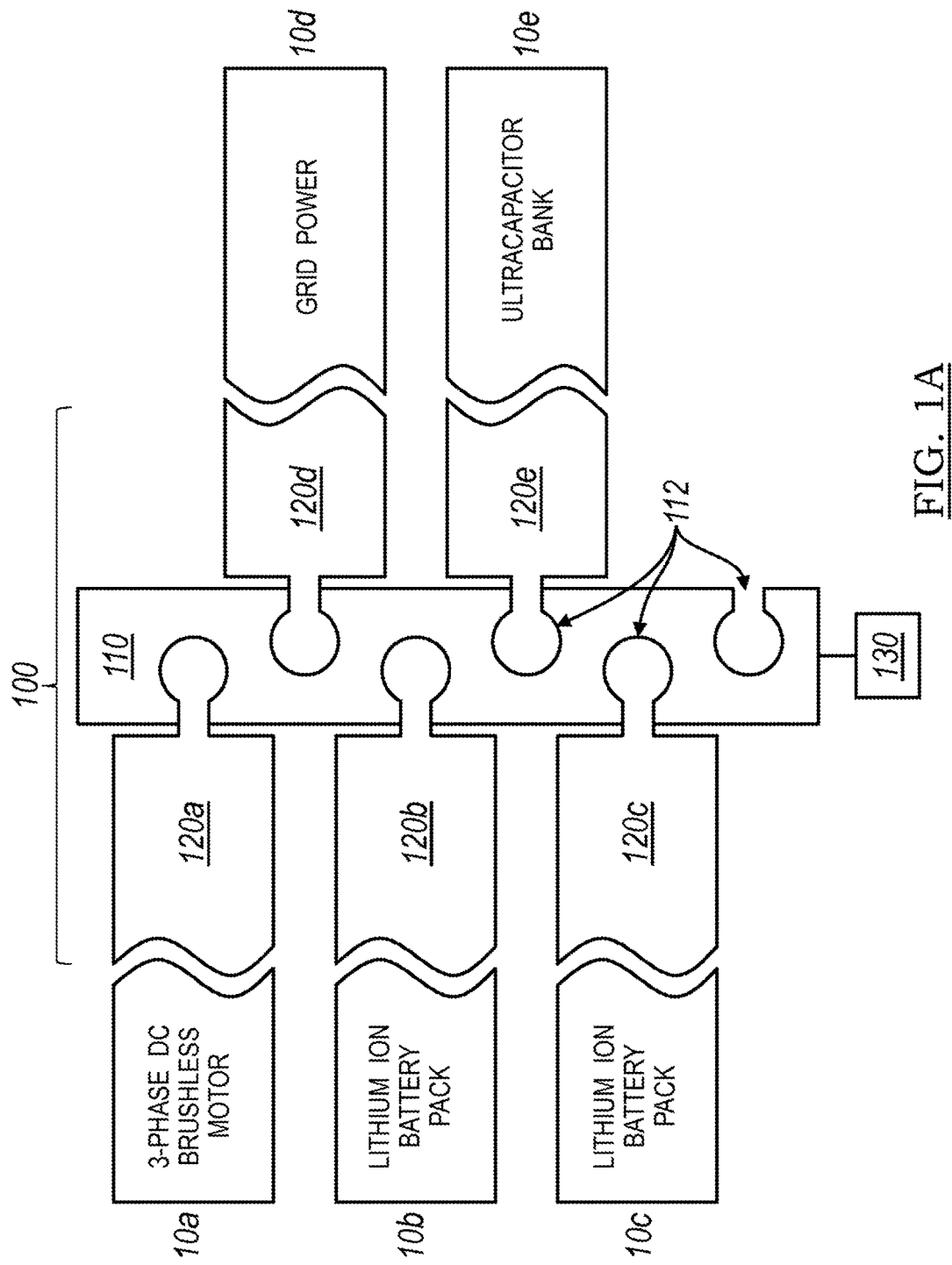
FIG. 1a is a schematic representation of the system of the preferred embodiments.
Figures 2, 3:
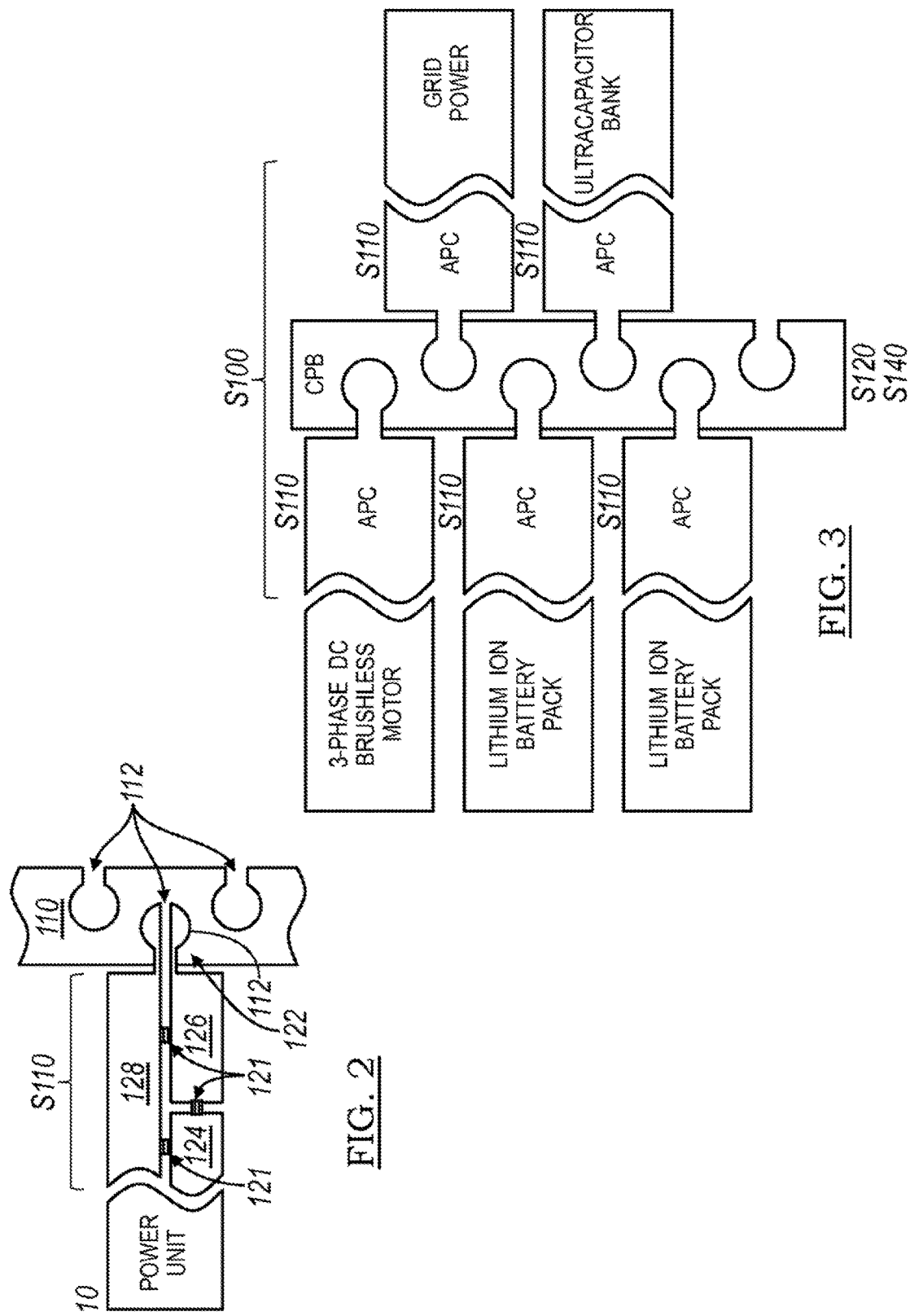
FIG. 2 is a schematic representation of the components of the adaptable connector of the preferred embodiments.
FIG. 3 is a schematic representation of the method of the preferred embodiments.

As shown in FIGS. 1 and 2, the system 100 for managing a power system with a plurality of power components 10 of the preferred embodiments includes a central power bus 110, a plurality of adaptable connectors 120 that each electrically couple to a power component and to the central power bus 110, and a control processor 130 that receives the state of each power component 10 from the respective adaptable connector 120 and is configured to balance the voltage and current between a power component that provides power and a power component that receives power based on the received states. Each adaptable connector 120 preferably includes a power bus connector 122 that interfaces with the central power bus 110, a power component connector 124 that interfaces with the power component, a processor module 126 that determines the state of the power component and communicates the state of the power component 10 to the central power bus 110, and a power controller 128 that regulates voltage and current flow between the central power bus 110 and the power component 10. The control processor 130 may be a central processor that is coupled to the central power bus 110 and communicates with each adaptable connector 120, but may alternatively be a distributed amongst each of the processors 126 of the adaptable connector 120, where each of the processors 126 of the adaptable connector 120 cooperate to balance the voltage and current output from each of the power source components. Alternatively, the control processor 130 may include a central processor and the processors 126 of at least a portion of the adaptable connector 120 and the central processor and the processors 126 may cooperate to balance the voltage and current output from each of the power source components. However, any other suitable arrangement of the control processor 130 may be used.

As shown in FIG. 3, the method S100 for managing a power system with a central power bus and a plurality of power components of the preferred embodiments includes the steps of electrically interfacing a power component to the central power bus through an adaptable connector that communicates with both the central power bus and the power component and monitors the state of the power component Step S110, balancing the voltage and current output from a power component that provides power to provide a desired power to a power component that receives power Step S120, receiving the state of each power component from the respective adaptable connector Step S130, and adjusting the balance of voltage and current flow to and from each power component based on the received states of each power component from the plurality of adaptable connectors Step S140.

The system 100 and the method S100 of the preferred embodiments allow dynamic adjustment and balancing of the voltage and current flow between the central power bus and each of the power components based on the states of each of the power components 10. This allows the system to quickly adjust to any changes in the state of the power components and/or the power components of the system. For example, in an electric vehicle, a power component 10 that receives power (or a power consumption component 14) may include a motor and a power component 10 that provides power (or a power source component 12) may include a battery. An input is received from the user of the vehicle that a burst of power is required (to quickly accelerate the vehicle). Because the states of each of the power source components 12 is known, the control processor 130 can quickly decide how much power to pull out from each power source component 12 that will (1) accommodate to the state of the power source component 12 (in particular, to output a level of power that will substantially maximize the life of the power source component and not cause the power source component 12 to fail), and will (2) provide a total power to the power consumption component 14 that is desired. The system 100 and the method S100 of the preferred embodiments also allow power components 10 to be replaced, removed, added, and/or updated with relative ease.

The adaptable connector 120 of the system 100 functions to communicate with both the power component 10 and the central power bus 110 and to "translate" communication between the power component 10 and the central power bus 110. This removes and relocates the component specific communication from the central power bus 110 to the adaptable connector 120 such that any design necessary to accommodate to a new power component 10 takes place within the respective adaptable connector, decreasing the need to redesign the central power bus 110 and/or the control processor 130, which may be substantially more complicated and/or expensive. The adaptable connector 120 also functions as the power "translator" that translates the power to a power component 10 from the central power bus 110 into power usable by the power component and translates the power from a power component 10 into power usable by the central power bus 110. The adaptable connector 120 also functions to monitor and report the state of the power component 10. Because the computation and/or sensing systems required in determining the state of each power component 10 may be different, this also decreases the computation burden and the communications requirements on the central power bus 110 and/or the control processor 130 to accommodate for each new power component 10. Additionally, this may allow an older central power bus and/or control processor 130 to accommodate to newer power components 10 without the need to reinstall and/or update the older components. In other words, in addition to translating communication between the power component 10 and the central power bus 110, the adaptable connector 120 also functions to simplify the data from each power component 10 into relatively simple states that are understandable by the central power bus 110 and/or the control processor 130. However, the system 100 and method S100 of the preferred embodiments may function to simplify the adaptation of and/or communication between power components 10 and the central power bus 110 and/or control processor 130 using any other suitable system and/or method.

The power components 10 of the system may function to receive power (or a power consumption component 14)

and/or to provide power (or a power source component 12). The power components 10 may interchangeably provide and receive power (for example, a motor that receives electrical power to convert into work and provides power by converting work into electrical power), For example, an electric vehicle may include power components 10 that include batteries and a motor. When the electric vehicle is in use on the road, the batteries may function to provide power and the motor may function to receive power. However, as the electric vehicle brakes to decrease speed, the motor may function to provide power by converting work into electrical power, which may slow the vehicle through regenerative braking, and the batteries may function to receive the translated electrical power. When the electric vehicle is parked and connected to a power grid, the batteries may function to receive electric power from the power grid to charge the batteries, but may alternatively function to provide power to the power grid, for example, during high power usage times of the day. The control processor 130 preferably functions to detect when a power component 10 is providing power to appropriately change the balance of voltage and current flow within the power system. Alternatively, each power component may function only to receive power or to provide power. However, any other suitable arrangement of power flow in the power components 10 may be used.

Power components 10 that provide power may include any power component that can store, output, and/or generate energy, for example, a lithium ion battery, nickel metal hydride battery, a lithium polymer battery, capacitors, flywheels, a solar panel, a wind turbine, a motor, a power grid, or any other suitable power component that can provide power. Power components 10 that receive power may include a power component that performs a function (such as "work") when provided with power, for example, a motor, a displacement device, a pump, a display, a heat exchange system, or any other suitable type of device that performs a function when provided with power. Power components 10 that receive power may also be power storage or power redistribution components, for example, rechargeable batteries, or a power grid. However, any other the power components 10 may include any other suitable power component that receives and/or provides power. Each power component 10 preferably includes one unit of the power component (e.g., one battery pack), but may alternatively include a plurality of power components (e.g., a plurality of battery packs of substantially the same type or different type). Similarly, each power component may include multiple motors of substantially the same type or different type). The power components 10 may receive and/or output power in any suitable form, for example, alternating current (AC) or direct current (DC) and/or high voltage, low voltage, or any other suitable type of power.

The System of the Preferred Embodiments

As shown in FIGS. 1 and 3, the central power bus 110 of the system 100 functions to integrate the power components 10 of the system, and to transfer power between a power component 10 that receives power (a power consumption component 14) or a power component 10 that provides power (a power source component 12). As described above, the roles of receiving power and providing power may be interchangeable among the power components 10 of the system. The central power bus 110 also transfers power to the circuitry within the system, for example, the components of the adaptable connector 120 and/or the control processor 130. The central power bus 110 may also transfer communication between the adaptable connectors 120 and the control processor 130. The central power bus 110 includes a plurality of adaptable connector receivers 112, which function to interface with an adaptable connector 120 to communicate with and/or exchange power with the adaptable connector 120 and the power component 10. The adaptable connector receiver 112 may include a port that both communicates and exchanges power with the adaptable connector 120, as shown in FIGS. 1 and 2, but may alternatively include a port for communication and another port for power exchange with the adaptable connector 120. Preferably, each adaptable connector receiver 112 is substantially similar or identical to other adaptable connector receivers 112 of the central power bus 110 such that an adaptable connector 120 may be interchangeably interfaced with each adaptable connector receiver 112 based on the desired arrangement of the power components 10 within the system. Alternatively, the adaptable connector receivers 112 may include a first type of receiver for a first type of adaptable connector and a second type of receiver for a second type of adaptable connector. In this variation, the first type of receivers may be tailored for adaptable connectors for power source components and the second type of receivers may be tailored for adaptable connectors for power consumption components. Alternatively, the first type of receivers may be tailored for adaptable connectors for a first type of power source component and the second type of receivers may be tailored for adaptable connectors for a second type of power source component. However, any other suitable combination of variations in the plurality of adaptable connector receivers 112 may be used. The adaptable connector receiver 112 may be a female plug receiver and the power bus connector 122 may be a male plug that plugs into the female plug receiver, as shown in FIGS. 1 and 2. Alternatively, the adaptable connector receiver 112 may be a male plug that plugs into a female plug receiver of the power bus connector 122. However, the adaptable connector receiver 112 and the power bus connector 122 may be any other suitable arrangement and/or combination of male and female plug types.

The central power bus 110 preferably includes a power link that transfers power. The power link preferably transmits direct current (DC) power and may includes a pair of DC high-power cables with a capacitance in between the two DC high-power cables that may function to filter out high frequency noise and/or stabilize voltage within the high power cables, but may alternatively include a combination of high-power and low-power cables to both provide higher voltage power for power components and lower voltage power to the circuitry within the power system such as the components of the adaptable connector 120 and/or the control processor 130. For example, the power link may include a low-power cable that is referenced to a return high-power cable. Alternatively, the power link may function to transmit alternating current (AC) power. In this variation, the power link may include a pair of AC high-power cables, for example, two high-power cables for single phase AC power or three high-power cables for three-phase AC power. However, any other suitable combination of high-powers to transmit the desired type of AC power may be used. However, any other suitable arrangement of the power link may be used to transmit power through the central power bus 110.

The central power bus 110 also includes a communications link that functions to transfer communication, for example, state and control information. Preferably, the communications link is wired and includes wires that can transmit data. The wires may be fiber optic cables, but may alternatively be any other suitable type of data carrying wire. The wires may also include a plurality of wires, to form a communication cable such as an Ethernet cable, phone cable, or any other suitable type of multi-wire communication cable. Alternatively, the communications link may be wireless and may utilize wireless data transmitters that communicate, for example, through WiFi or Bluetooth technology. However, the communications link may transmit data using any other suitable system. The communications link may include a processor that complies to a communication protocol and link layer, such as the FlexRay™ protocol or a Controller Area Network (CAN) protocol. However, the communications link may utilize any other suitable type of communication protocol and link layer.

Figure 1B:
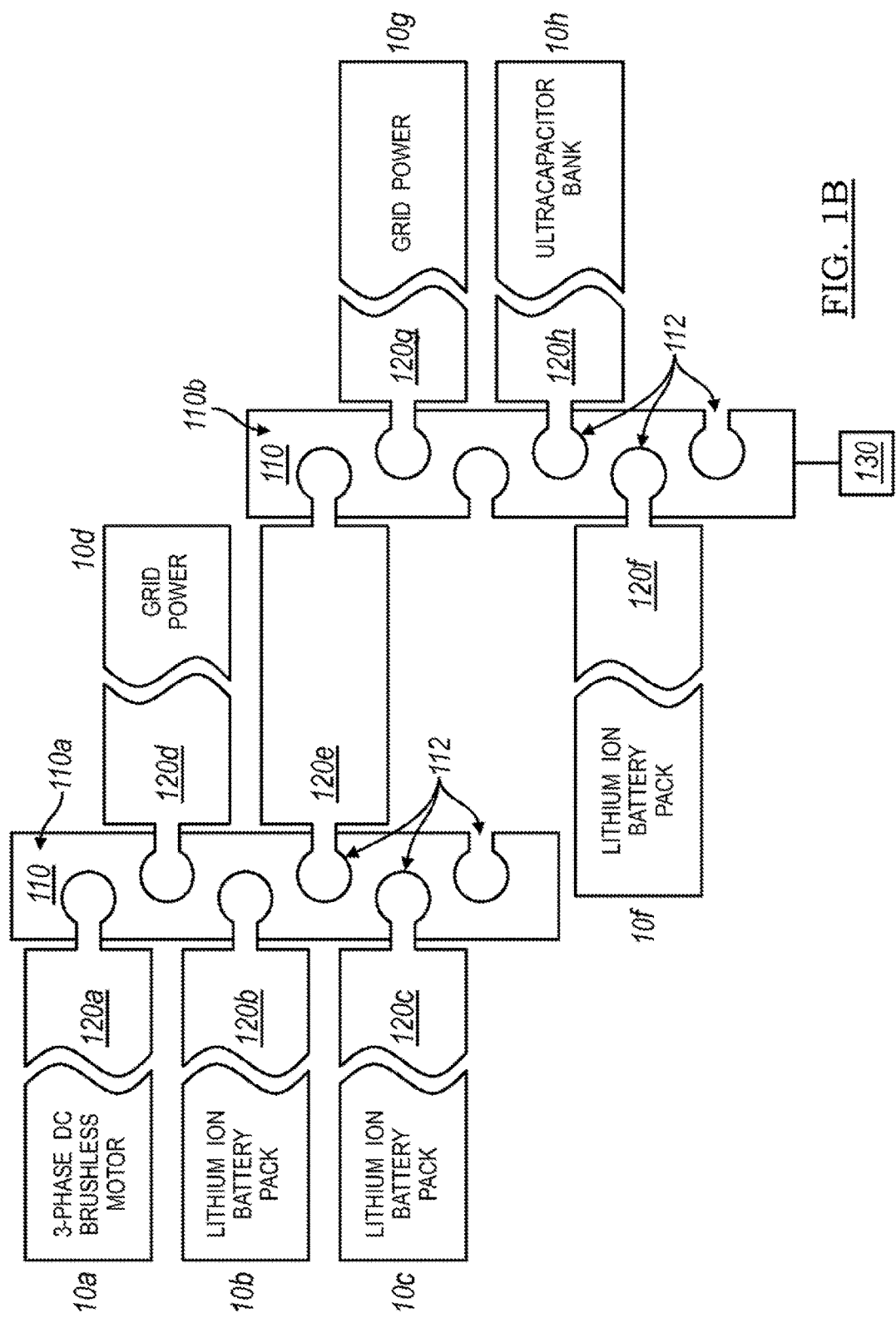
FIG. 1b is a schematic representation of a variation of the system of the preferred embodiments.

As described above, the adaptable connectors 120 of the system 100 function to collaboratively allow power components 10 that may each communicate differently and/or have different operation parameters to communicate and exchange power to the common central power bus 110. In other words, the adaptable connector 120 for each power component 110 functions to translate between the power component 10 and the central power bus 110, allowing, with little or no modification, a common central power bus 110 to continue to communicate and use each power component 10 even when each power component is substantially different and/or new power components 10 are introduced to the power system and when power components 10 are exchanged and/or removed from the power system. As shown in FIG. 1, the adaptable connectors 120 may be used in an electric vehicle and may function to connect a power component 10a such as a motor (power consumption component 14), power components 10b and 10c such as individual battery packs (power source components 12), power component 10d such as a grid power that can be used to charge the battery packs (power source component 12), and power component 10e such as a plurality of ultra-capacitors that store energy (power source component 12). Another example of an arrangement of power components 10 connected in a power system through the adaptable connectors 120 may include a plurality of solar panels connected to a central power bus 110, each through an adaptable connector 120, and another adaptable connector 120 that connects the central power bus 110 to an electrical grid and/or a battery to use and/or store the power generated by the solar panels. The adaptable connector may additionally function to translate and transmit power between a first central power bus 110a and a second central power bus 110b that communicates and/or operates differently from the first central power bus 110a, as shown in FIG. 1b. In other words, the power component in this variation may be the second central power bus 110b from the perspective of the first central power bus 110a, This may be particularly useful in an electric vehicle fleet where each electric vehicle includes an internal central power bus and each vehicle connects to a larger central power bus that charges portable power that is connected to the internal central power bus. However, this variation may be used towards another suitable arrangement and/or scenario of central power buses. In this variation, the adaptable connector may include a second power bus connector 122 that interfaces with the second central power bus 110b. The second power bus connector 122 may replace the power component connector 124, but may alternatively be an additional interface, thus allowing the adaptable connector to both interface with a power component and the second central power bus 110b. In this variation, the adaptable connector 120 may function to only translate communication, but may also function to both translate communication as well as control power exchange and/or convert power between the first and second central power buses 110a and 110b. A power component may also be connected to the central power bus 110 through more than one adaptable connector 120 for redundancy or to meet power requirements. For example, there may be two adaptable connectors 120 that couple a central power bus to an electrical grid because the connection between the central power bus and the electrical grid may be substantially important to the function of the power system.

Alternatively, the connection to the electrical grid may require more power than can travel through a single connector, and may require two connectors. However, the adaptable connectors may be of any other suitable number within the power system and may function to connect any other suitable type of power component 10 to the power system.

The adaptable connectors 120 of the system 100 also preferably function to monitor the state of the connected power component 10 and report the state to the control processor 130, which then determines the amount of power (voltage and/or current output) to use from each power source component to collectively provide a desired total power to a power consumption component (or the voltage and/or current input into a power storing power source component from a power generating power consumption component). Each adaptable connector 120 preferably includes a power bus connector 122 that interfaces the adaptable connector 120 to the central power bus 110 (preferably through the adaptable connector receiver 112), a power component connector 124 that interfaces with the power component, a processor module 126 that determines the state of the power component and communicates the state of the power component 10 to the central power bus 110, and a power controller that regulates voltage and/or current flow between the central power bus 110 and the power component 10.

The power bus connector 122, the power component connector 124, the processor module 126, and the power controller 128 preferably each include connectors 121 that allow each component of the adaptable connector 120 to communicate with another, as shown in FIG. 2. In particular, the power component connector 124 preferably interfaces with the power controller 128, which then interfaces with the power bus connector 122. The processor module 126 preferably also interfaces with the power controller 128 to retrieve information regarding the power component 10 and/or to pass power information from the control processor 130, and preferably interfaces with the power bus connector 122 to communicate the state of the power component 10 to the central power bus 110. The processor module 126 may also interface with the power component connector 124 to determine the state of the power component 10, but may alternatively interface with sensors that facilitate in the determination of the state of the power component 10 (as described below). The connector 121 is preferably a wired combination of a male and female plug system, but may alternatively be any other suitable type of connector. Each interface connector 121 may be of substantially the same type, but may alternatively be different. For example, the interface connections between the power controller 128 and the power component connector 124 and the power bus connector 122 may be wired while the interface connection between the power controller 128 and the processor module 126 may be wireless. However, any other suitable type of connector that allows for the suitable communication and/or power transfer between the components of the adaptable connector 120 may be used.

Figure 4B:
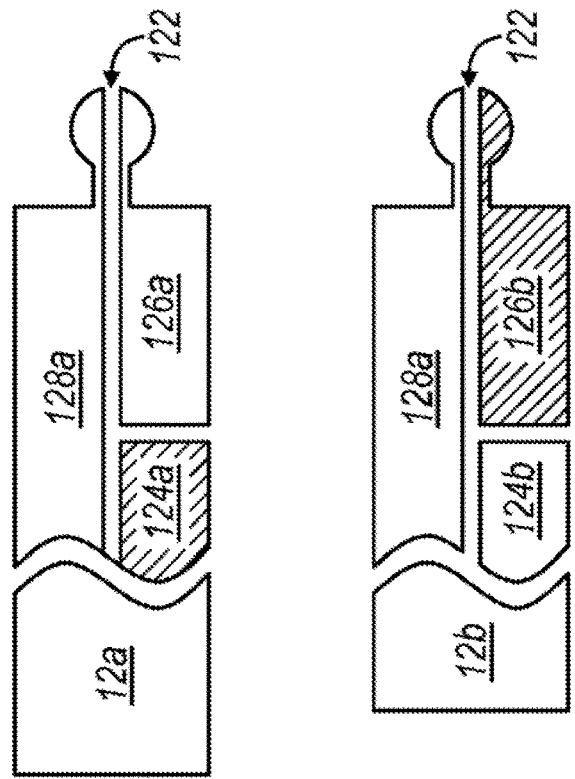
FIGS. 4a and 4b are schematic representations of a variety of combinations of the components within the adaptable connector of the preferred embodiments.
Figure 4A:
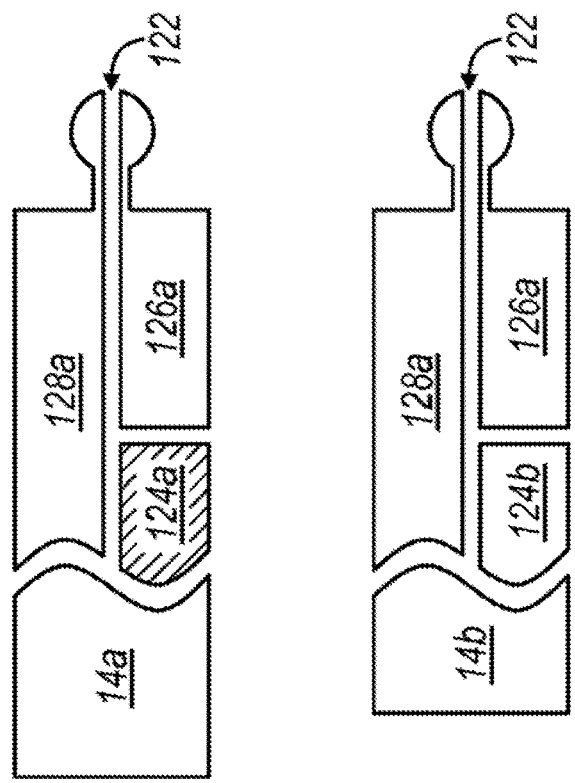

The connectors 121 in between the components of the adaptable connector are preferably standard for each interface such that, for example, a new power controller 128 made for a new power component 10 may interface with an older power component connector 124, and/or an upgraded processor module 128 may substantially easily interface with an older power component connector 124 and/or power bus connector 122. Alternatively, common connections may allow for different types of each component to be switched in and out substantially easily, for example, to improve the design of the adaptable connector for a particular power component 10. For example, as shown in FIG. 4a, a first power component connector 124a may be used for a motor of type A (power consumption component 14a) and a second power component connector 124b may be used for a motor type B (power consumption component 14b) while other components remain the same. Similarly, as shown in FIG. 4b, a first power component connector 124a and processor module 126a may be used for a battery pack of type A (power source component 12a) and a second power component connector 124b and processor module 126b may be used for a battery pack of type B (power source component 12b) while other components remain the same. However, any other suitable arrangement of the connectors may be used.

Figure 5:
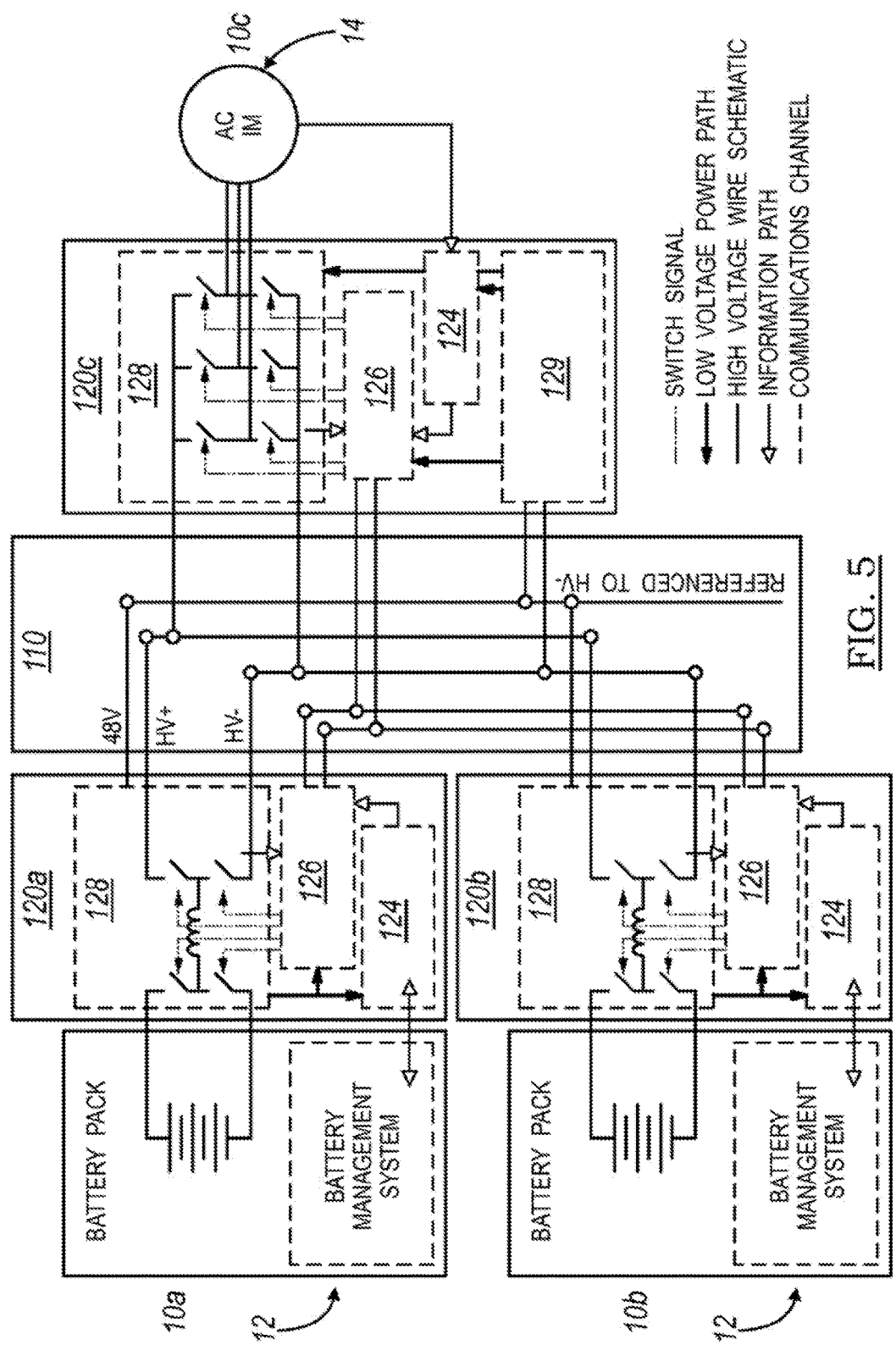
FIG. 5 is a schematic representation of the electrical components within the system of the preferred embodiments.

The adaptable connector 120 may alternatively also include a power distribution module 129 (as shown in FIG. 5) that functions to supply operating power to other adaptable connectors. For example, the power distribution module in an adaptable connector 120 may function to take power from the attached power component 10 to distribute power through the central power bus 110 to other adaptable connectors 120. This may be particularly useful where the components (such as the processor module 126) of the adaptable connectors 120 may use lower voltage power while other power components 10 that receive power use higher voltage power.

The power bus connector 122 functions to interface the adaptable connector 120 to the central power bus 110 (preferably through the adaptable connector receiver 112). As described above, the adaptable connector receiver 112 and the power bus connector 122 may be an arrangement of male and female plug types. The power bus connector 122 preferably includes a data connection to the processor module 126 and a power connection to the power controller 128 and functions to relay data from the processor module 126 (for example, regarding the state of the power component 10) to the central power bus 110 and to transfer power from the power component 110 through the power controller 128 to the central power bus 110. By allowing the power bus connector 122 to interface with both the processor module 126 and the power controller 128, one connector may be used to interface the adaptable connector 120 with the central power bus 110. Alternatively, the power bus connector 122 may be integrated into the processor module 126 and the power controller 128. For example, each of the processor module 126 and the power bus connector 122 may include an interface that substantially directly connects to the central power bus 110 without interfacing with another component. However, any other suitable arrangement of the power bus connector 122 may be used.

The power component connector 124 functions to communicate information and power between the power controller 128 and the power component 10. The power component connector 124 may also function to communicate information between the processor module 126 and the power component 10. The power component connector 125 is preferably a substantially permanent connector that maintains contact between the power component 10 and the adaptable connector 120 throughout the useful life of the power component 10. Alternatively, the connector 121 may be a wired combination of a male and female plug system, but may alternatively be any other suitable type of connector. In the variation where the processor module 126 utilizes sensors to determine the state of the power component, the power component connector 124 preferably connects the sensors to the power component 10. However, the power component connector 124 may function to connect any other suitable portion of the adaptable connector 120 that allows for power flow to and/or from the power component 10 and/or determination of the state of the power component 10.

The processor module 126 functions to determine the state of the power component 10. The processor module 126 may also function to interpret communication from the control processor 130 regarding the power flow between the power component 10 and the central power bus 110 and/or communicate the power flow information to the power controller 128. The processor module 126 may also function to communicate with central power bus 110 and may retrieve operation parameters for the power component 10, for example, the speed at which to run a power component that is a motor. The processor module 126 may include a microprocessor and memory storage that contains software to determine the state of the power component 10 and control the power flow between the power component 10 and the central power bus 110 through the power controller 128 by communicating to the power controller 128 instructions based on the determined power flow. The processor module 126 may also function to prevent power flow from the power component 10 through the adaptable connector 120 when the adaptable connector 120 is not connected to a central power bus 110. Similarly, the processor module 126 may also function to allow power flow after connection of the adaptable connector 120 to the central power bus 110 only after the connection is validated, for example, through a handshake process. This may help prevent a power component 10 from being connected incorrectly to a central power bus 110. Similarly, the processor module 126 may function to prevent power from flowing between the power component 10 and the central power bus 110 when an error state is detected, for example, within the power component 10 or the central power bus 110. The software contained in the memory storage may preferably be updated as necessary. As described above, the processor module 126 may be interchangeable between different adaptable connectors 120.

The processor module 126 functions to determine the state of the power component 10 by monitoring an operation parameter of the power component 10. The operation parameter may be a measureable parameter (for example, temperature, voltage, position, or current), but may alternatively be a calculated parameter (for example, state of charge, remaining operation time, or projected power generation capability). The state is evaluated periodically during the use of the power component to provide substantially real time updates to the control processor 130 regarding the state of the power component 10 such that control processor 130 may adjust the management of a particular power component 10 on a substantially real time basis, increasing the efficient use of each power component 10 at any one time. The determined state of the power component 10 may include information on whether the power component 10 is functioning normally (or, in other words, if the power component is "healthy") or abnormally (or, in other words, if the power component is "unhealthy") based on the operating parameters of the power component. Each state may include a plurality of degrees, for example, a power component may be reported as very healthy, healthy, borderline healthy, slightly unhealthy, unhealthy, and/or very unhealthy. A power component that is reported as very unhealthy may be close to failure and/or in need of replacement and/or maintenance. Alternatively, the health of a component can be reported in a continuous manner such as a state of health that is represented by a real number with value between 0.0 and 1.0, where 0.0 represents very unhealthy and 1.0 represents very healthy. However, any other suitable number or type of health state may be reported. Alternatively, the determined state of the power component 10 may include more detailed information, for example, the position of the rotor of a motor or the remaining charge within a battery. For a power component such as a battery, the processor module 126 preferably monitors the temperature, temperature gradient within the battery pack (for example, the difference between the coldest and hottest cell), heat generated by the battery pack, heat rejected by the battery pack, state of charge, current, internal impedance, or any other suitable operation parameter of the battery. For a power component such as a motor, the processor module 126 preferably monitors the temperature (for example, of the rotor and/or the stator of the motor), the magnetic flux, the rotor speed, rotor position, or any other suitable operation parameter of the motor. For a power component that includes a heat exchange system, the processor module 126 preferably monitors the temperature of the system, for example, the inlet and outlet temperatures of a coolant. Operation parameters are preferably detected through sensors that are coupled to the power component 10. Sensors may include temperature sensors, position sensors, current sensors, voltage sensors, or any other suitable type of sensor. The processor module 126 may also include analog to digital converters that can convert analog sensor signals into digital signals that may be interpreted by the microprocessor. However, any other suitable sensors may be used. To determine operation parameters that are calculated, the software stored in the memory storage preferably utilizes measurable parameters to calculate the desired parameters. However, any other suitable method to determine an intrinsic quality of the power component may be used.

The processor module 126 may determine the state of the power component 10 using one of a variety of methods. In a first variation, the memory storage of the processor module 126 preferably also functions to store historical operation data of the power component 10 that is used to determine and/or estimate the state of the power component 10. As data is taken and analyzed in real time on the operation parameters of the power component 10, the processor may compare the most current data to historical data to determine whether abnormal activity is detected, for example, if the most current data is of an expected value based on the recorded historical performance of the power component. In a second variation, the memory storage of the processor module 126 may store a threshold value for a particular operation parameter (e.g., maximum temperature or minimum state of charge) and when the most current data is beyond the threshold value, abnormal activity is determined. In this variation, the threshold values may be stored in the control processor 130 and the processor module 126 may function to report the actual operation parameter for the control processor 130 to evaluate relative to the threshold value. However, any other suitable method and/or parameter may be used to determine the state of the power component 10.

The power controller 128 functions to regulate voltage and current flow between the central power bus 110 and the power component 10. As described above, the power controller 128 is preferably interchangeable between adaptable connectors 120. The power controller 128 may also function to assist the processor module 126 in determining the state of the power component 10, for example, if the power controller 128 detects any abnormal power fluctuations from the power component 10. The power controller 128 preferably receives instructions from the control processor 130 (or through the processor module 126) on the power flow and regulates the voltage and current flow based on the instructions. Each adaptable connector 120 preferably includes one power controller 128 for each power component 10, but may alternatively include multiple power controllers 128 for the power component 10 in an adaptable connector 120. For example, in the variation of the power component 10 that includes multiple units, for example, multiple battery packs, the adaptable connector may include a power controller 128 for each unit. This may be particularly useful where the available power controller 128 design is rated for a power level that is lower than the desired power level, and the power component 10 cannot be split into a plurality of units that each have their own adaptable connector 120. In this arrangement, a plurality of available lower power type power controllers 128 may be used in a single adaptable connector 120, resulting in the desired power level for the adaptable connector 120 and power component 10 without splitting the power component 10. Such a situation may arise when only one power controller 128 design is available, a particular power controller 128 is more cost effective, a particular power controller 128 is easier to implement, and/or any other reason. This may also be particularly useful in cases where a battery pack with a desired power output and with a desired voltage output cannot be found and, instead, a battery pack that may have a desired power output but with a lower than desired voltage output is found. A plurality of these suitable battery packs may be connected together in series (or in a series parallel combination) to produce the desired voltage output. The combined battery packs may be electrically coupled and controlled by one power controller 128, but alternatively, the battery packs may each be connected to a dedicated power controller 128, where the power controllers 128 may be arranged in a series, parallel, or any other suitable type of connection within the adaptable connector 120. This may allow for more accurate control of each battery pack and/or more accurate determination of the state of each battery pack. However, any other suitable arrangement of the power controller 128 within the adaptable connector 120 may be used.

Figure 6:
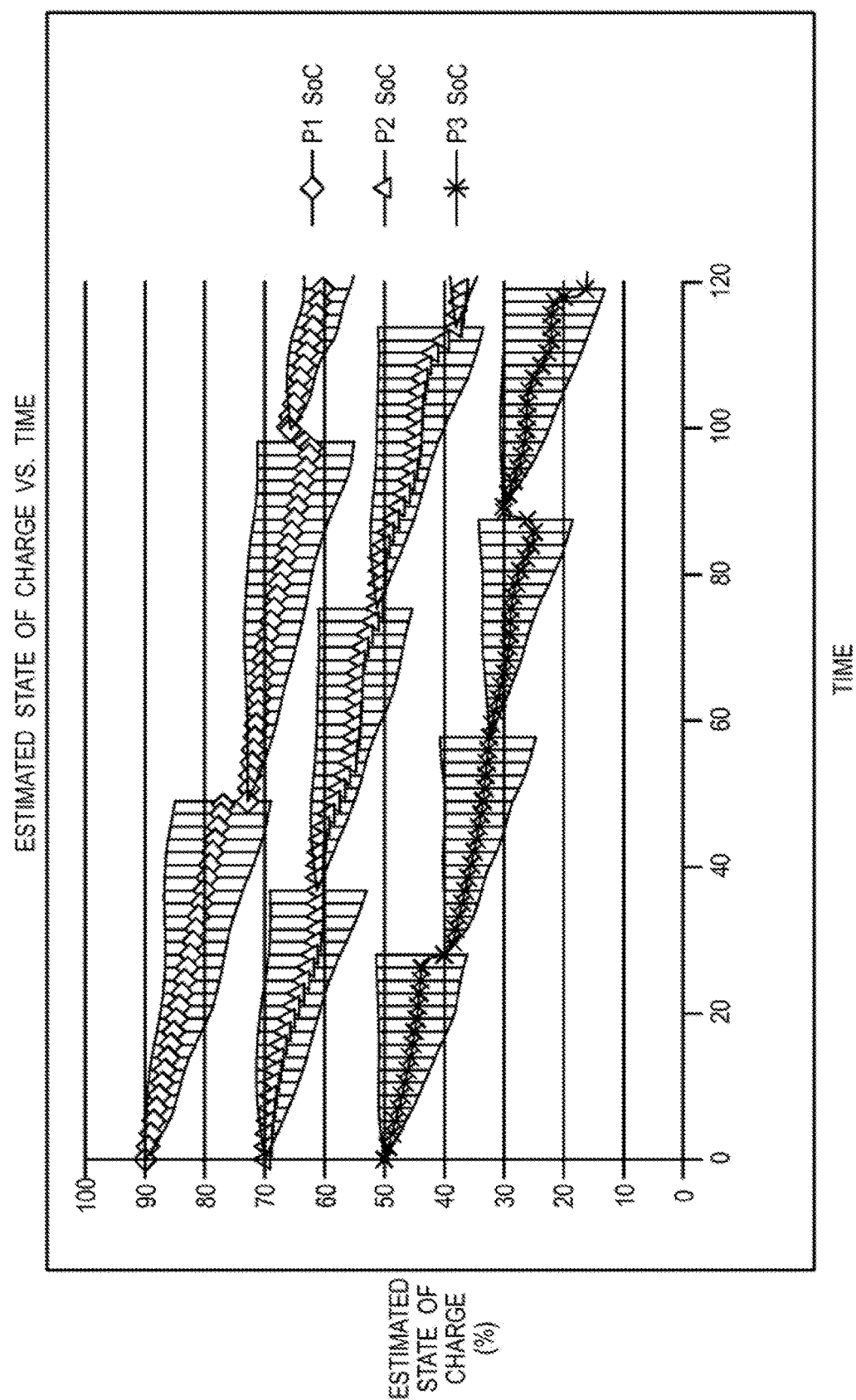
FIG. 6 is a graph representing the increasing error in state of charge (SoC) measurements with time and use of a recalibration method of the preferred embodiments.
Figure 7:
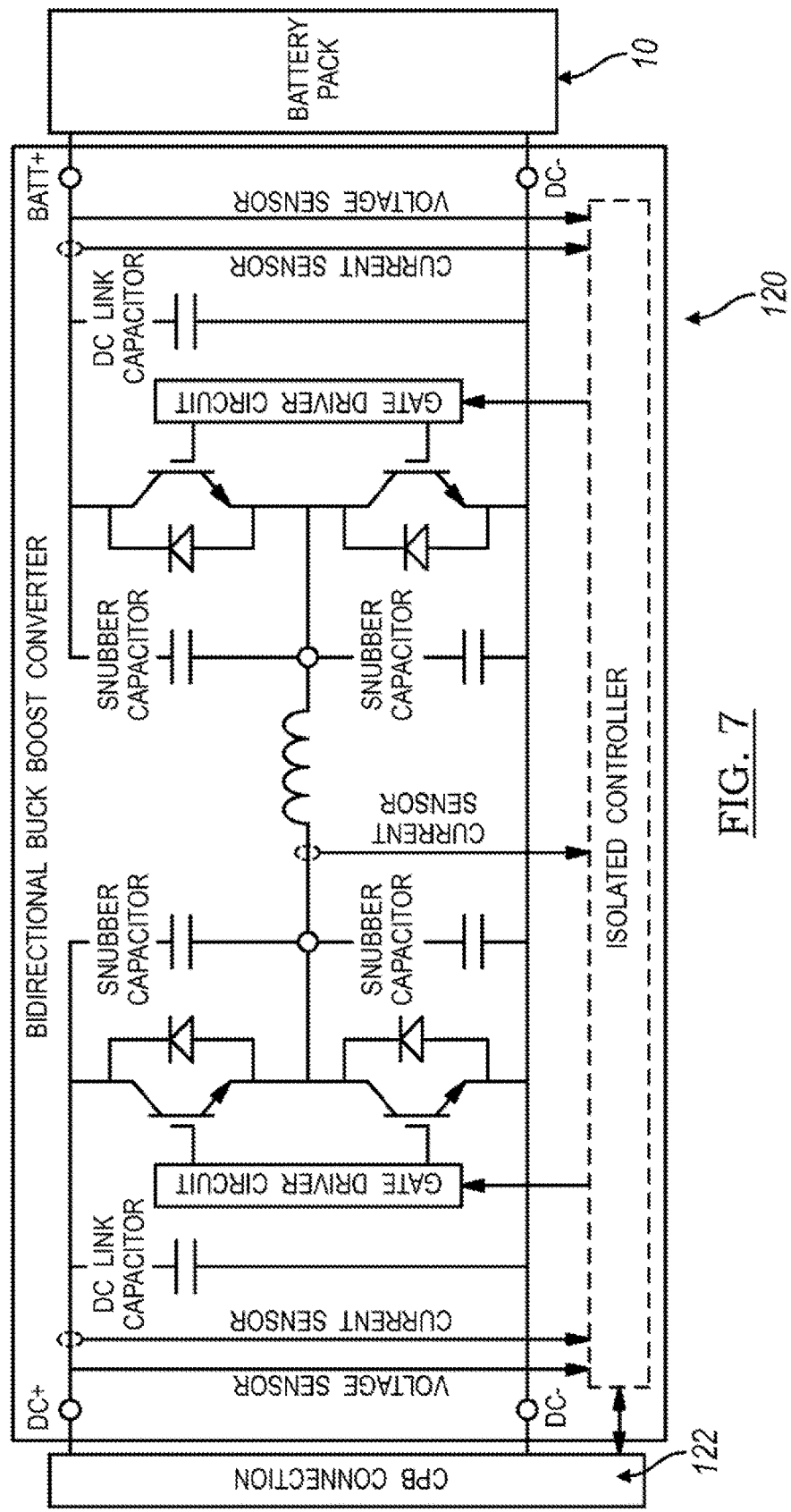
FIGS. 7 and 8 are schematic representations of variations of the electrical components within the adaptable connector.
Figure 8:
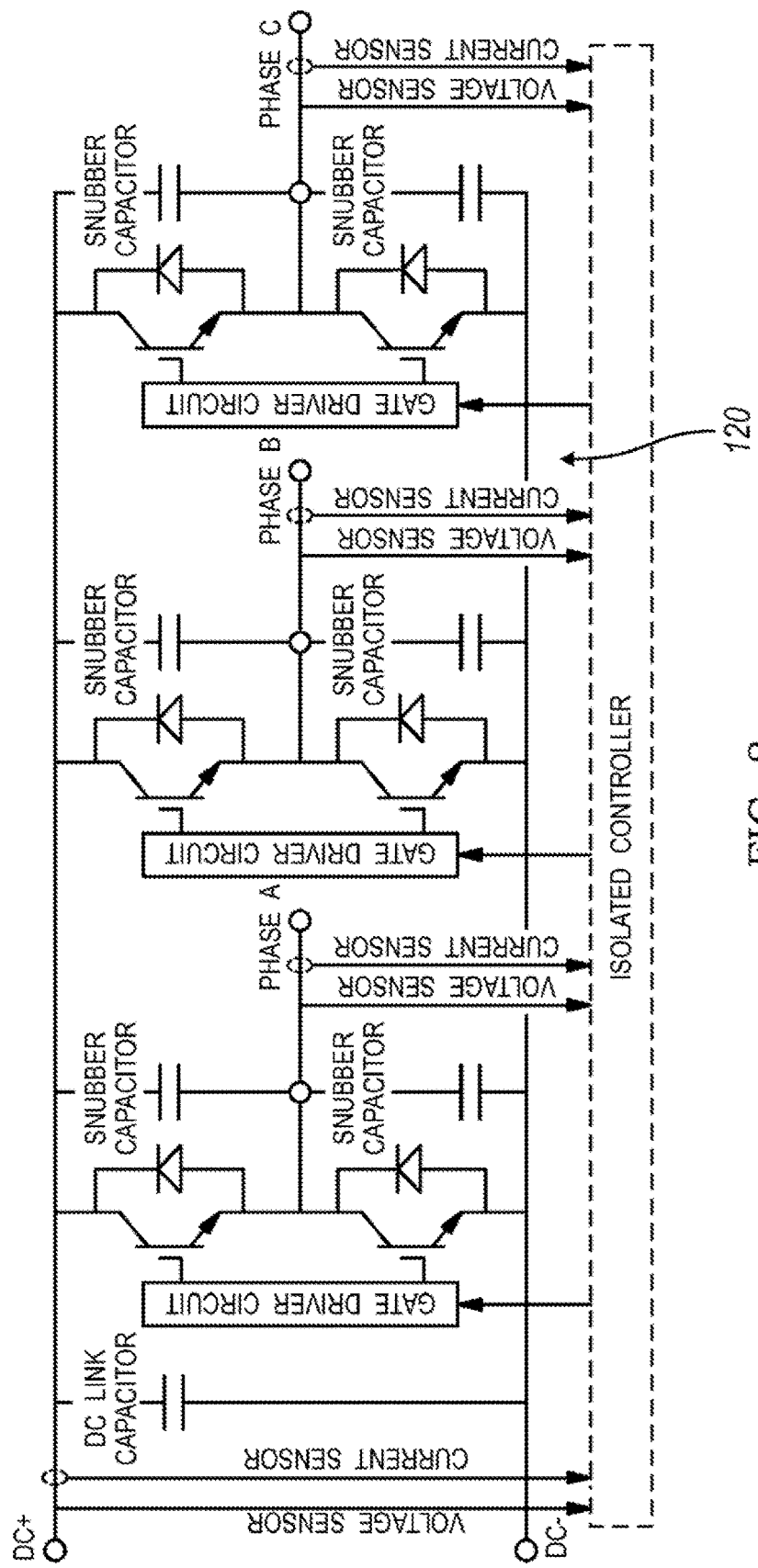

The power controller 128 preferably includes a plurality of switches and electrical components that cooperate to control and/or convert the power flow between the power component 10 and the central power bus 110, for example, a variable direct current link, as shown in FIGS. 5, 7, and 8. The combination of switches and/or other electrical components are preferably tailored to the type of power component 10 that is to be interfaced, for example, a battery or a motor and preferably function to convert power from a power component 10 that is usable by the central power bus 110 or to convert power from the central power bus 110 that is usable by the power component. The power controller 128 may also function to convert power from the central power bus 110 to power the components of the adaptable connector. The switches may cooperate to form power converters that are suitable for the type of power component 10 that is to be interfaced, such as a three-phase bridge or a buck converter, which are known in the art. The switches may be MOSFET switches, physical switches, or any other suitable type of switch. The electrical components may include transformers, amplifiers, inductors, capacitors, or any other suitable type of component that manipulates power. However, the power controller 128 may include any other suitable component arranged in any other suitable way to regulate the power flow between the power component 10 and the central power bus 110, as shown in FIGS. 5, 6 and 7.

The adaptable connector 120 of the system 100 of the preferred embodiments is preferably of a variation described above. Alternatively, the components of the adaptable connector 120 may be combined into a singular structure, for example, a printed circuit board that accomplishes both the functions of the power controller 128 and the processor module 126. However, any other suitable arrangement of the adaptable connector 120 may be used.

The control processor 130 functions to receive the state of each power component 10 from the associated adaptable connector 120 and to determine the power flow between each power component 10 and the central power bus 110 to balance the voltage and current between a power component that receives power and a power component that provides power and to adjust the balance based on received state information. The control processor 130 preferably detects when a power component 130 is providing power and functions to appropriately balance the voltage and current flow within the power system. For example, when a motor in an electric vehicle applies regenerative braking and causes a current to flow into the central power bus 110 from the motor, the control processor 130 preferably detects the current flow and manages the power input from the motor and directs it towards power components 10 that receive power (e.g., the batteries) based on the state of those power components 10 that receive power. The control processor 130 preferably functions to determine the voltage and current output from a power component that provides power (a power source component 12) based on the state of each power source component 12. The control processor 130 preferably also functions to determine the voltage and current input into a power component that receives power (a power consumption component 14) based on the received state of the power consumption component 14. For example, if the power consumption component 14 is determined to be overheating and the desired power to be provided to the power consumption component 14 may further increase the overheating of the power component 10, the control processor 130 may decrease the power provided into the power consumption component 14 to protect the power consumption component 14 from further overheating.

The control processor 130 may also function to receive instructions from an external source regarding the amount of power desired at the power consumption component 14. For example, in the variation where the system 100 is used in an electric vehicle, the control processor 130 may receive instructions on how much power is required of the motor (power consumption component) of the electric vehicle. In the variation where the system 100 is used in a power generation system such as one with a plurality of solar panels (power source component) and storage batteries (power consumption component), the control processor 130 may receive instructions on the goal for how much power to store in each of the storage batteries. The instructions may be provided by an operator of the system, for example, the driver of the electric vehicle, but may alternatively be informed from a database, for example, based a database of information on day to day characteristics of the sun on a particular day, a goal for amount of solar power generated may be provided from the database to the control processor 130. The instructions may also be determined by control processor 130, for example, the control processor 130 may monitor environmental conditions such as the ambient temperature and/or the ambient pressure, and based on the measured environment conditions, the control processor 130 may determine appropriate operating conditions (for example, from a database of appropriate operating conditions based on environment conditions). However, the control processor 130 may receive any other suitable type of instruction.

The states and/or instructions may be received by the control processor 130 all at one time, but may alternatively be received in a set pattern or "schedule." In a first variation, the control processor 130 may recognize the power components 10 attached to the central power bus 110 and/or any other external command component that is also attached to the central power bus 110. Upon recognition, the control processor 130 may assign a time for the component to "report" either the state or instruction to the control processor 130, for example, every two minutes starting at a particular time. In a second variation, the control processor 130 may assign an order to the components, for example, the power consumption component reports after the power source component reports. In a third variation, the control processor 130 may assign a ranking to the components. For example, if a state of a particular component has a tendency to change more rapidly than another, such as instructions from a driver of a vehicle compared to the state of the ventilation system of the vehicle, the rapidly changing component may be given priority in reporting state and/or instruction. By scheduling communication from each component over the central power bus 110, the communications link of the central power bus 110 may be kept open to allow desired information to be transferred. If all communication signals were to be transmitted at one time, bandwidth of the communications channel may not be used effectively, or a priority inversion may occur, decreasing the efficiency of the communication and, subsequently, the control of the system. However, any other suitable scheduling of communication may be used.

The control processor 130 functions to balance the voltage and current output from each power source component 12 to provide a desired power to a power consumption component 14 based on the received states of each power component 10. Each power component 10 may include a "healthy" state and an "unhealthy" state. In this variation, the step of balancing the voltage and current from each power source component 12 to provide a desired power to a power consumption component 14 preferably includes decreasing the voltage and/or current output from an "unhealthy" power source component 12 and increasing the voltage and/or current output from a "healthy" power source component 12 to compensate for the decreased power from the "unhealthy" power source component 12 to provide the desired power to the power consumption component 14. The control processor 130 may increase the voltage and/or current output from one other power source component 12, but may alternatively increase the voltage and/or current output from more than one power source component 12. Compensating the decrease in power output from one power source component by increasing power output from more than one power source component may spread the burden across multiple power source components and may decrease the degradation of the power source components. In determining the amount of power output increase for a compensating power source component, the control processor 130 preferably also take into account the state of the compensating power source component. For example, to compensate for the decreased power output of another power source component, the power output of a first power output component may be increased by a first amount and the power output of a second power source component may be increased by a second amount less than the first amount if the second power source component is reported to be less "healthy" than the first power source component. However, any other power arrangement among the power components 10 based on the reported health state may be used.

The control processor 130 may also function to control the power flow outside of normal operating parameters between a power component 10 and the central power bus 110 to recalibrate measurement of an operation parameter or estimation of the state of the power component 10, for example, to substantially stop power flow. In this variation, the control processor 130 may cooperate with the processor module 126 of the adaptable connector associated with the power component to determine the timing for a recalibration function. Alternatively, the processor module 126 may communicate with the control processor 130 that calibration is needed, for example, the processor module 126 may report a "recalibration" state to the control processor 130. Because the processor module 126 is designed for the power component 10 and may be better suited to operate calibration of the power component, the power flow to and/or from the power component 10 during calibration may be controlled by the processor module 126 and the control processor 130 may function to monitor the power flow and balance the overall power within the central power bus 110 using the other power components 10 in the system. However, any other suitable control and/or method of carrying out calibration may be used. For example, to measure the state of charge in a battery during use, a current sensor may be used to determine the amount of charge that is entering or exiting the battery pack. This measurement may be coupled with a voltage measurement at a particular time that is used with the measured current of the battery pack and the type of the battery pack to determine the state of charge (SOC) of the battery pack. However, as use time increases, the accuracy of the state of charge (SOC) measurement is decreased, as shown in FIG. 6. The control processor 130 (or the processor module 126) may recalibrate the state of charge measurement by decreasing the power output of the battery pack to substantially zero such that the voltage measurement of the battery pack is substantially identical to an open circuit voltage, which may be used to provide a much more accurate measurement of the state of charge within the battery, as shown in FIG. 6. Alternatively, the power output of the battery pack may be increased and decreased in a known pattern to increase the accuracy of an estimation of the internal impedance of the battery pack. However, any other suitable method to calibrate a measurement of an operation parameter of the power component 10 may be used.

The control processor 130 is preferably a central processor that communicates with each adaptable connector 120 of the power system. Alternatively, the control processor 130 may be distributed into a portion or all of the processors 126 of the plurality of adaptable connectors 120, as described above, such that the adaptable connectors 120 may collaboratively perform power management of each of the power components 10. For example, each adaptable connector 120 reports the state of the associated power component 10 to the other adaptable connectors 120 that include processors 126 that are involved in the power management of the system. Based on the received states of the power components 10, the adaptable connectors 120 may cooperatively determine the amount of power (voltage and/or current output) from each power source component 12 to use to contribute toward a desired total power to the power consumption components 14. In an example of this variation, the adaptable connector 120 of a first power source component 12 may determine that the state of the associated power source component is low charge. Based on this state, the adaptable connector 120 may determine a preference for providing less power to the central power bus 110 and allowing other power source components 12 to compensate for the low power output of the associated power source component 10. However, the states of other power source components 12 are reported to the adaptable connector 120 as also being of low charge. As a result, the adaptable connector 120 determines to allow the associated power source component 12 to provide a higher power output so that the other power source components 12 in the system are not overburdened. However, any other suitable method of cooperative power determination may be used.

Exemplary Arrangements of the Power System

As described above, the system 100 and method S100 of the preferred embodiments may be used with a plurality of different combinations of power components through the different available designs of the adaptable connector 120.

In a first specific example of an adaptable connector, the power component 10 is an induction machine such as a 300 kW alternating current induction machine (Or motor). In this example, the adaptable connector 120 may include a power controller 128 that includes a three-phase switching converter that connects to the high power lines of the central power bus. A substantially similar power controller 128 may also be used in connecting a 300 kW permanent magnet synchronous machine or to any other 300 kW power components that can be regulated by a three phase bridge, as shown in FIG. 8, and the processor module 128 may include a microprocessor to control the power controller 128 and/or the induction machine based on information from the central power bus 110 and/or the control processor 130. The information may include the desired torque, the desired speed, the state of other power components connected to other adaptable connectors in the system, or any input from some other interface or component connected to the central power bus 110 which may include a gas pedal, button, LCD screen, computer, or computer terminal. The microprocessor is coupled to the power controller 128 in a way such that signals from the microprocessor may control the switching devices of the power controller 128. The software in the memory of the processor module 126 may implement an algorithm such as field-oriented control to control the AC induction machine and determine the state of the AC induction machine. The power component connector 124 may also connect a rotor position sensor to the processor module 126. In the variation where the adaptable connector includes a power distribution module, the power distribution module may include a buck converter with isolation transformer to step down power from the central power bus 110 and provide regulated low-voltage power to the other components of the adaptable connector 120.

In a second specific example, the power component is a battery such as a 40 kW battery pack. In this example, the power controller 128 of the adaptable connector 120 may include power electronics circuitry including the switching devices, inductors, and capacitors of a bidirectional buck-boost converter, as shown in FIG. 8. The power controller 128 of this example may be interchangeable with other adaptable connectors that connect to a 40 kW ultracapacitor or any other 40 kW power device that can be regulated by a bidirectional buck-boost converter. The processor module 126 may include a microprocessor to control the power controller 128 and/or the induction machine based on information from the central power bus 110 and/or the control processor 130. The information may include the desired current, or the desired voltage, and/or the state of other power components connected to other adaptable connectors 120. The microprocessor is connected to the power controller 128 such that signals from the microprocessor may control the switching devices of the power controller 128. The software of the processor module 126 implements an algorithm for tracking the state of charge of the battery pack and communicates the determined state to the central power bus 110. The processor module 126 may also receive information from the power controller 128 regarding the desired current, voltage, and/or the temperature of the power component 10.

Figure 9:
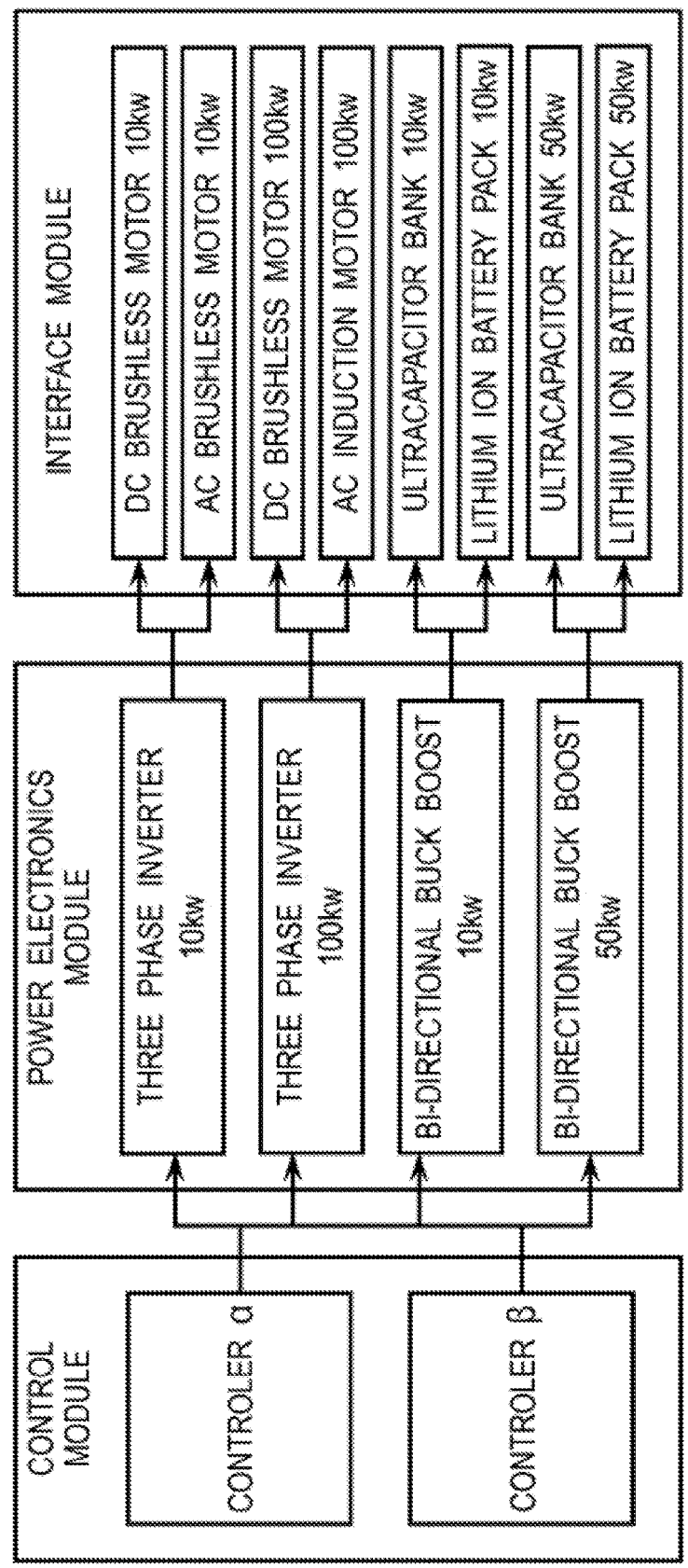
FIG. 9 is a schematic representation of a library of designs for the components of the adaptable connector that may be used to build an adaptable connector for a particular power component.

As described above, the adaptable connector may be one of a multitude of combinations of components that allow the adaptable connector to adapt to a variety of power components. The designs of the components of the adaptable connector may be stored within a collection or a library that may be referenced to put together an adaptable connector that is adapted to a particular power component 10. The library may also include pre-combined variations of components for a particular type of power component 10 that may be referenced. The library of adaptable connector 120 designs preferably includes designs for a range of power levels of power components 10 as well as different classes of power components, for example, as shown in FIG. 9. Classes of power components may include AC induction machines, brushless DC machines, ultracapacitor banks, and lithium-ion battery packs and power range. Power level ranges may include 0-10 kW, 0-100 kW, and 0-200 kW. However, the library may include any other suitable type of information.

Figure 10:
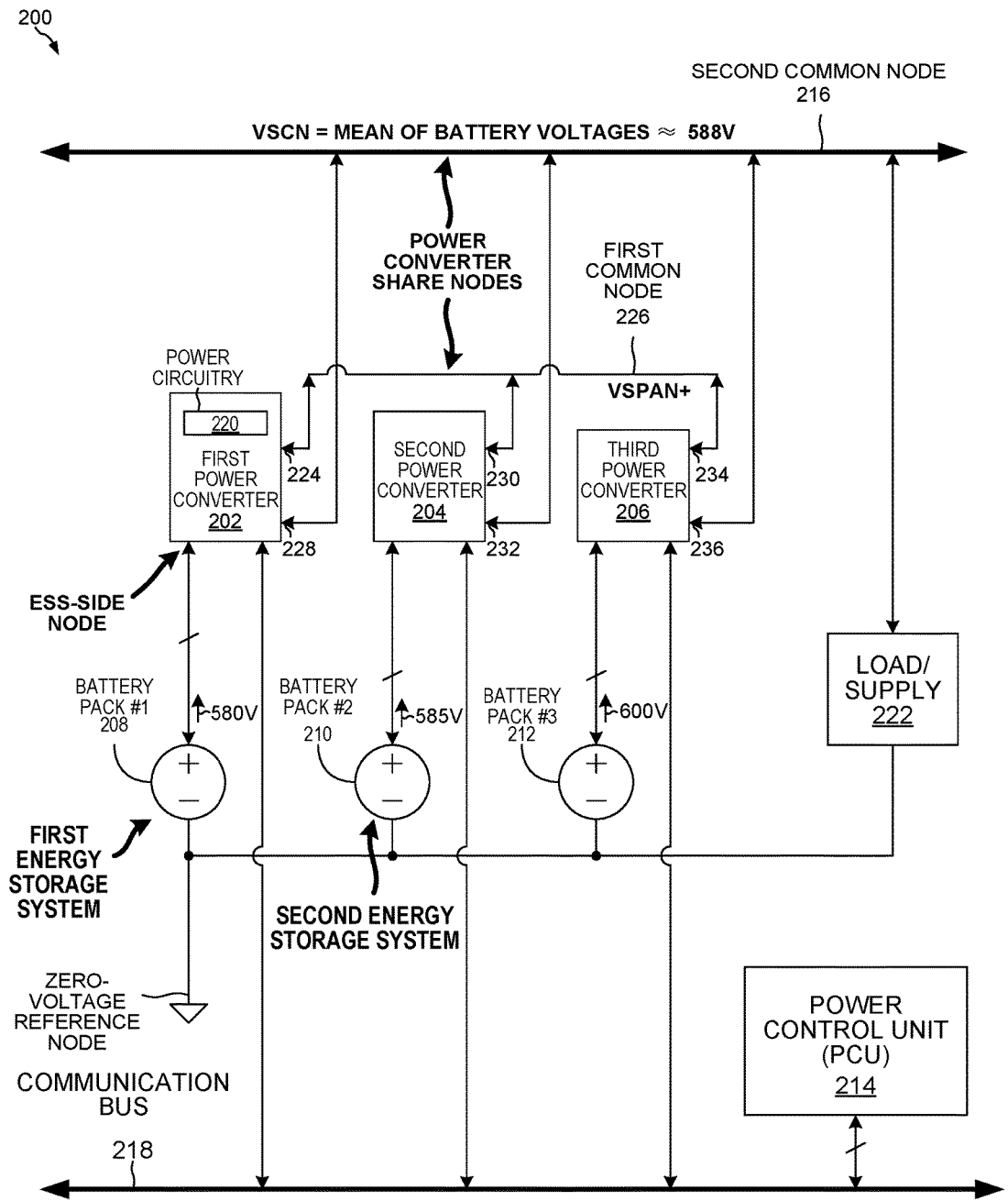
FIG. 10 is a high level diagram of a power system 200.

FIG. 10 is a high level diagram of a system 200. System 200 comprises a plurality of power converters 202, 204, and 206, a plurality of energy storage systems 208, 210, and 212, a power control unit (PCU) 214, a load or supply 222, and a communication bus 218. The PCU 214 communicates with each of the power converters 202, 204, and 206 via the communication bus 218. Each power converter includes an amount of power circuitry 220. The power converters are each coupled to a first common node 226 and a second common node 216. The common nodes 226 and 216 are also referred to as a "power converter share nodes" because each power converter is coupled to nodes 226 and 216. In this example, each of the energy storage systems 208, 210, and 212 is a battery pack.

The system 200 controls the power converters 202, 204, and 206 to regulate the voltage on one or more of the power converter share nodes 216 and 226 to be substantially constant during a period of time. In this example, the voltage VSCN on second common node 216 is substantially equivalent to the mean voltage output by all battery packs 208, 210, and 212 of the system 200. First power converter 202 is coupled to first battery pack 208 and has a first node 224 coupled to a first common node 226 and a second node 228 coupled to the second common node 216. Second power converter 204 is coupled to second battery pack 210 and has a first node 230 coupled to first common node 226 and a second output node 232 coupled to the second common node 216. Third power converter 206 is coupled to third battery pack 212 and has a first node 234 coupled to first common node 226 and a second node 236 coupled to the second common node 216. Each battery pack 208, 210, and 212 has a terminal coupled to a zero-voltage reference node.

In this example, the system 200 maintains a voltage on the second common node 216 substantially constant voltage level VSCN. The voltage level is determined from voltages output by the battery packs. In one example, VSCN is set to a mean voltage of all voltages output by the battery packs 208, 210, and 212. In the example of FIG. 10, battery pack #1 208 outputs 580V, battery pack #2 210 outputs 585V, and battery pack #3 212 outputs 600V. The mean voltage is approximately 588V. Accordingly, system 200 controls power converters 202, 204, and 206 such that the voltage VSCN present on the second common node 216 is maintained at approximately 588V.

Figure 11:
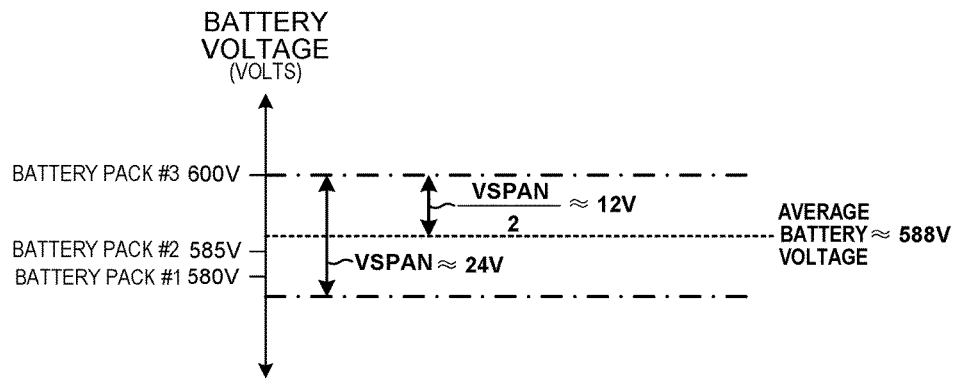
FIG. 11 is a diagram showing the voltages output by each battery pack 208, 210, and 212 and the mean battery voltage.

FIG. 11 is a diagram showing the voltages output by each battery pack 208, 210, and 212 and the mean battery voltage. A span voltage VSPAN is equivalent to two times a maximum deviation between any one of the battery output voltages and the mean battery voltage. In the example of system 200 shown in FIG. 10, the maximum deviation between any one of the battery output voltages and the mean battery voltage is the voltage output by battery pack #3 which outputs 600V. The deviation is approximately 12V. The span voltage is approximately 24V. The span voltage VSPAN indicates the maximum voltage any of the power converters 202, 204, and 206 would have to process to maintain the voltage on second common node 216 at the mean battery voltage during operation. Thus, no power converter in system 200 processes more than twice the maximum deviation between any battery voltage and the mean battery voltage.

In accordance with one novel aspect, the span voltage VSPAN is no more than one-fifth of a maximum output battery voltage. As a result, system 200 yields significant efficiency gains, cost savings, and switching speeds. If the span voltage VSPAN is set to no more than one-fifth of the maximum output battery voltage, then no power converter of system 200 will need to process more than one-fifth of the maximum output battery voltage. Consequently, the power converters of system 200 involve lower voltage switches and diodes thereby reducing manufacturing costs as compared to conventional power converters that are typically configured to process hundreds of volts. The low voltage switches can also be switched faster than conventional high voltage switches. In addition, smaller inductors and capacitors are needed.

Figure 12:
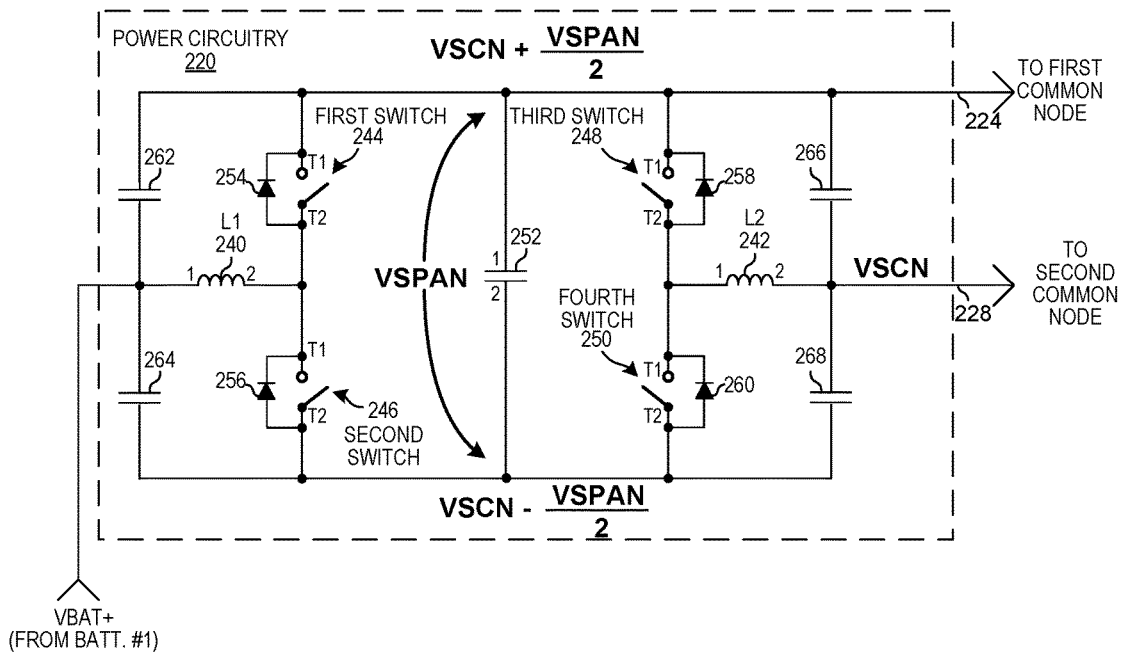
FIG. 12 is a detailed circuit diagram of power circuitry 220 of first power converter 202 shown in FIG. 10.

FIG. 12 is a detailed circuit diagram of power circuitry 220 of first power converter 202 shown in FIG. 10. Power circuitry 220 comprises a first inductor L1 240, a second inductor L2 242, a first switch SW1 244, a second switch SW2 246, a third switch SW3 248, a fourth switch SW4 250, a main capacitor 252, diodes 254, 256, 258, 260, and capacitors 262, 264, 266, and 268. In one example, the switches 244, 246, 248, and 250 are N-channel Metal Oxide Semiconductor Field-Effect Transistors (MOSFETs). In another example, the switches 244, 246, 248, and 250 are Insulated-Gate Bipolar Transistors (IGBTs). Power circuitry 220 has three and only three power nodes. In this example, the amount of power circuitry 220 is configurable to operate as a bi-directional DC-to-DC power converter. Node 224 is coupled to the first common node and the voltage on the first common node is regulated to a voltage equal to the supply voltage VDCL plus half the span voltage VSPAN. Node 228 is coupled to the second common node and the voltage on the second common node is regulated to VDCL, which is the mean voltage output by all battery packs.

Figure 13:
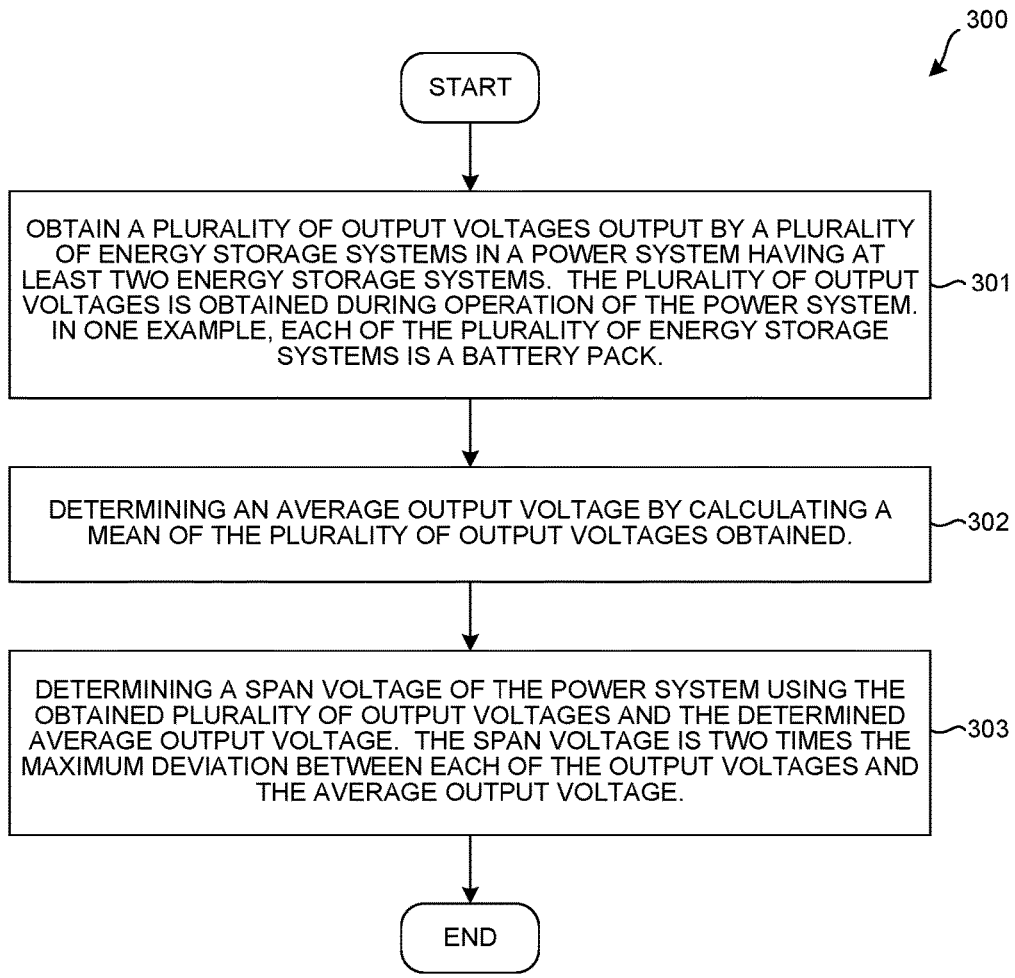
FIG. 13 is a flowchart of a method 300 in accordance with one novel aspect.

FIG. 13 is a flowchart of a method 300 in accordance with one novel aspect. The method 300 is one technique for obtaining the span voltage of system 200. In a first step (step 301), a plurality of output voltages output by a plurality of energy storage systems in a power system having at least two energy storage systems is obtained. The plurality of output voltages is obtained during operation of the power system. For example, in the example of FIG. 10, PCU 214 obtains the battery output voltage of each battery pack 208, 210, and 212 by communicating with power converters 202, 204, and 206 via communication bus 218. In this example, the plurality of output voltages is 580V, 585V, and 600V.

In a second step (step 302), an average output voltage is determined by calculating a mean of the plurality of output voltages obtained. In the example of FIG. 10, PCU 214 determines that the average output voltage is approximately 588V, which is obtained by averaging 580V, 585V, and 600V ([580V+585V+600V]/3).

In a third step (step 303), a span voltage of the power system is determined using the obtained plurality of output voltages and the determined average output voltage. The span voltage is two times the maximum deviation between each of the output voltages and the average output voltage. In the example of FIG. 10, PCU 214 determines that the average output voltage is approximately 588V and the maximum deviation is 12V. Thus, the span voltage is 24V.

Figure 14:
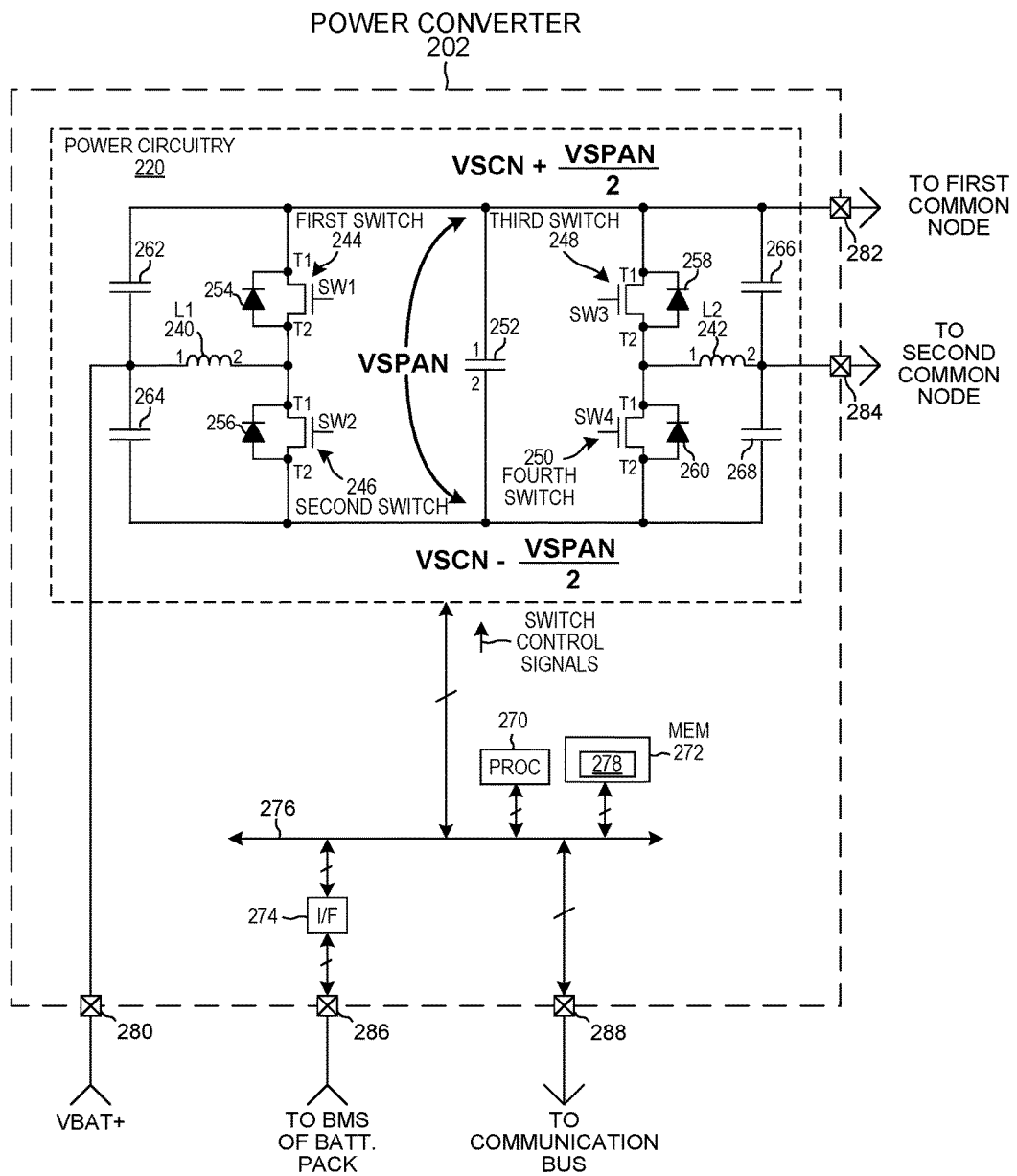
FIG. 14 is a detailed circuit diagram of the power converter of system 200.

FIG. 14 is a detailed circuit diagram of the power converter of system 200. Each of the first, second, and third power converters 202, 204, and 206 of system 200 is a substantially identical structure. First power converter 202 is described here in detail. Power converter 202 comprises power circuitry 220, processor 270, memory 272, interface circuit 274, and local bus 276. Memory 272 is a processor-readable medium that is readable by the processor 270. The memory 272 comprises a set of processor-executable instructions 278. When the processor 270 executes the instructions 278, the processor 270 causes the digital control signals SW1-SW4 to be generated and supplied onto gate terminals of the switches in power circuitry 220.

Power converter 202 is a five terminal device. The five terminals include three power terminals 280, 282, and 284 and two control terminals 286 and 288. Power terminal 280 is coupled to a battery pack output terminal of first battery pack #1 208 and receives output voltage VBAT+. Power terminal 282 is coupled to the first common node 226. Power terminal 284 is coupled to the second common node 216. Control terminal 286 is coupled to the Battery Management System (BMS) of first battery pack #1 208. Control terminal 288 is coupled to the communication bus 218.

The processor 270 causes the power circuitry 220 to operate in one of a plurality of selectable operating modes. In this example, the plurality of selectable operating modes includes a buck mode and a boost mode. For example, if the battery voltage output by battery pack #1 208 is less than the voltage on the second common node 216 (as shown in FIG. 10), then the processor 270 controls the power circuitry 220 to operate in a boost mode. On the other hand, if the battery voltage output by battery pack #1 208 is greater than the voltage on the second common node 216, then the processor 270 controls the power circuitry 220 to operate in a buck mode.

Figure 15:
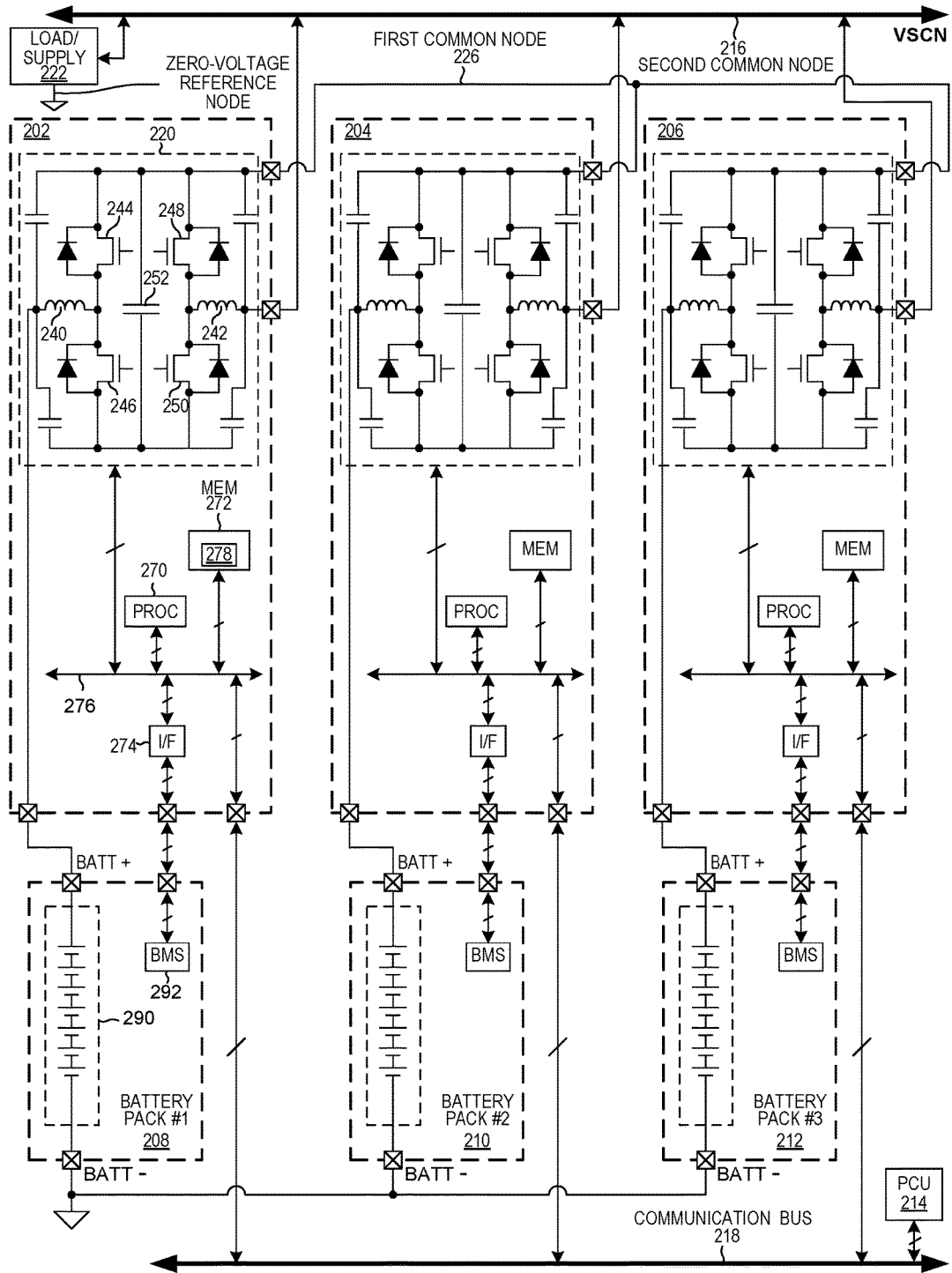
FIG. 15 is a detailed circuit diagram of the system 200.

FIG. 15 is a detailed circuit diagram of the system 200. PCU 214 controls operation of system 200 via communication bus 218. The PCU 214 also controls the manner in which each of battery packs 208, 210, and 212 supplies power to and receives power from the second common node 216 and regulates the voltage on the second common node 216 to remain at a constant voltage level. The PCU 214 also communicates with other power components that are supplied by the DC power bus 216, such as electric motors (not shown). Components comply with the Controller Area Network (CAN) protocol standard for communicating across bus 218. In other examples, the FlexRay protocol standard is used to communicate across bus 218.

The processor 270 in each of the power converters controls the power circuitry 270 to operate as a bi-directional power converter by supplying digital logic control signals SW1, SW2, SW3 and SW4 to the respective switches 244, 246, 248, and 250. Digital logic control signal SW1 is supplied to a third terminal T3 of first switch SW1 244. Digital logic control signal SW2 is supplied to a third terminal T3 of second switch SW2 246. Digital logic control signal SW3 is supplied to a third terminal T3 of third switch SW3 248. Digital logic control signal SW4 is supplied to a third terminal T3 of fourth switch SW4 250. Each battery pack comprises a plurality of cells 290 and a BMS 292.

In operation, processor 270 controls digital logic levels of the digital control signals SW1-SW4 such that battery pack #1 208 is charged or discharged. The digital logic levels and timing of the switching of the controls signals SW1, SW2, SW3 and SW4 depend upon whether current is flowing from a higher potential to a lower potential in which case the power converter 202 operates in buck mode, or whether current is flowing from a lower potential to a higher potential in which case power the converter 202 operates in boost mode. For additional information on the structure and operation of power converter 202 and PCU 214, see: 1) U.S. Patent Publication No. 2011/0089760, entitled "System And Method For Managing A Power System With Multiple Power Components", filed Oct. 20, 2010, by Castelaz et al., and 2) U.S. Patent Publication No. 2010/0237830, entitled "System and Method for Balancing Charge Within a Battery Pack", filed Mar. 23, 2010, by Castelaz et al. (the subject matter of each of these patent documents is incorporated herein in its entirety).

Figure 16:
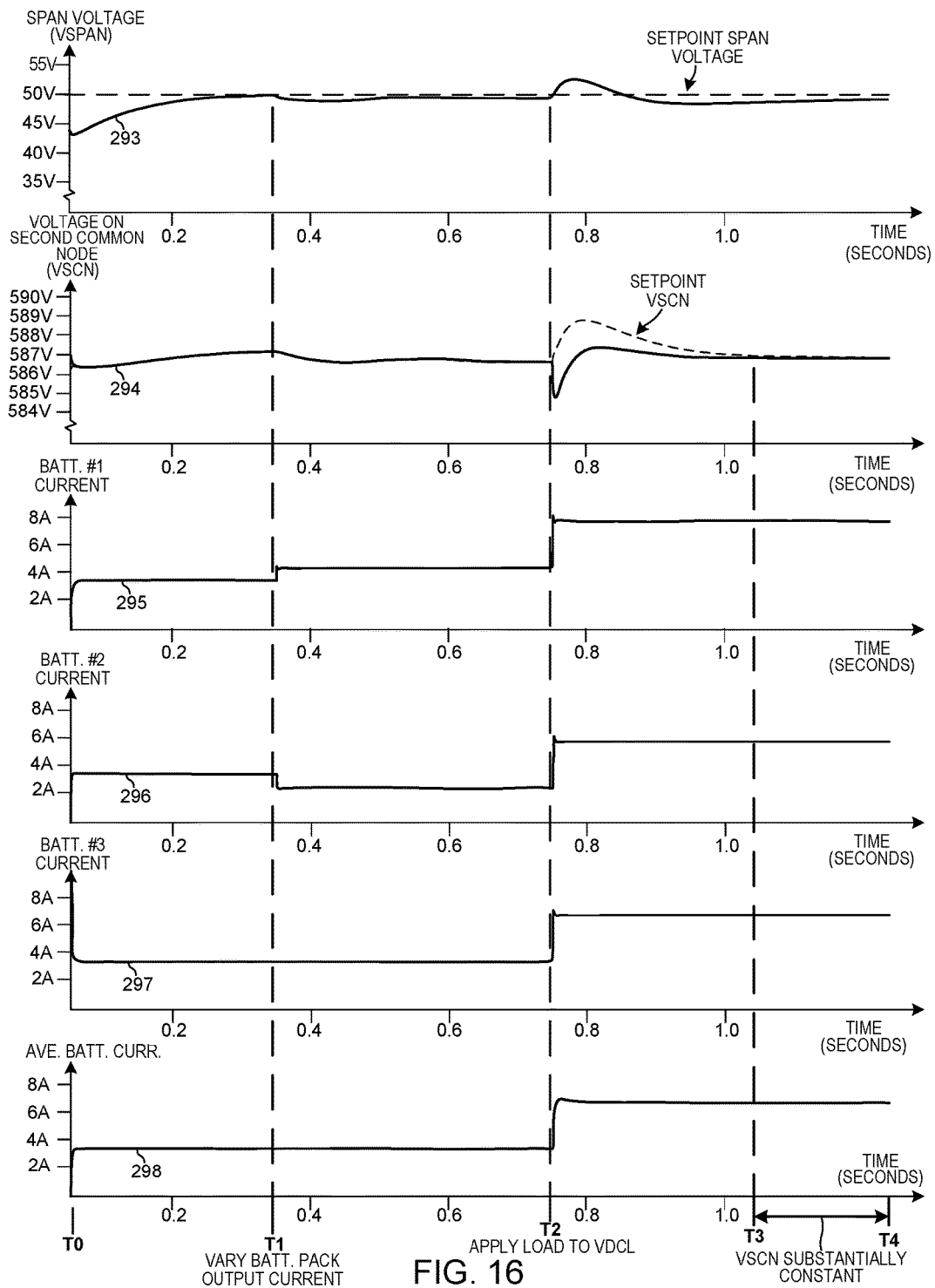
FIG. 16 is a set of waveform diagrams along various nodes of system 200 during operation.

FIG. 16 is a set of waveform diagrams along various nodes of system 200 during operation. Waveform 293 represents the span voltage VSPAN of system 200. The span voltage varies according to voltages output by battery packs of system 200. The span voltage is maintained to be 50V. Waveform 294 is a voltage VSCN on the second common node 216. Waveform 295 is a current through battery pack #1 208. Waveform 296 is a current through battery pack #2 210. Waveform 297 is a current through battery pack #3 212. Waveform 298 is a mean battery voltage output by battery packs #1-#3 208, 210, and 212.

At time T0, the system 200 has no load and power is distributed evenly across battery packs #1-#3 208, 210, and 212. At time T1, power distribution across battery packs #1-#3 208, 210, and 212 is varied. At time T1, output current of the battery packs #1-#3 is varied. As shown by waveform 298, the average battery current remains substantially unchanged between T0 and T1 and after T1. The system varies the power distribution of the batteries to account for differences in temperatures, State of Charge (SoC), and State of Health (SoH).

At time T2, a load is applied to the second common node 216. The load is a power component that is supplied by the second common node 216, such as an electric motor. As a result, current across the battery packs #1-#3 208, 210, and 212 increases to maintain the voltage on second common node 216 substantially constant. At time T3, the voltage on the second common node 216 returns to the desired voltage level. Between times T3 and T4, the voltage on DC power bus 216 remains substantially constant at VSCN while driving the load.

Figure 17:
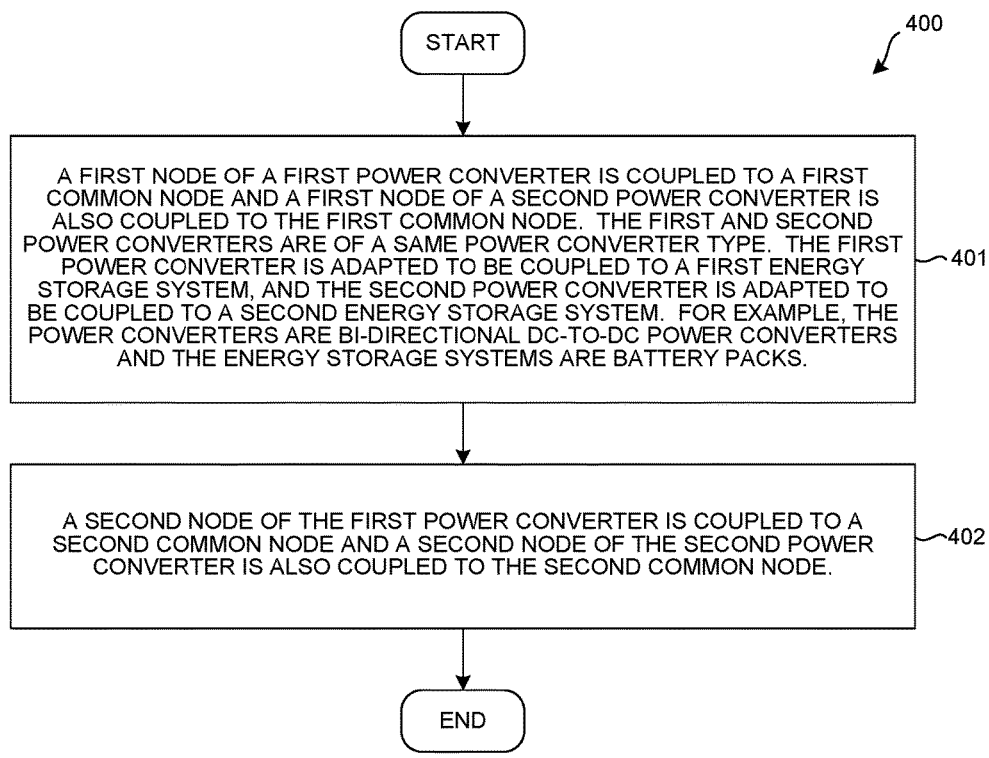
FIG. 17 is a flowchart of a method 400 in accordance with another novel aspect.

FIG. 17 is a flowchart of a method 400 in accordance with another novel aspect. In a first step (step 401), a first node of a first power converter is coupled to a first common node and a first node of a second power converter is also coupled to the first common node. The first and second power converters are of a same power converter type. The first power converter is adapted to be coupled to a first energy storage system, and the second power converter is adapted to be coupled to a second energy storage system. In the example of FIG. 10, node 224 of the first power converter 202 is coupled to first common node 226 and node 230 of the second power converter 204 is also coupled to the first common node 226. First and second power converters 202 and 204 are bi-directional DC-to-DC power converters.

In a second step (step 402), a second node of the first power converter is coupled to a second common node and a second node of the second power converter is also coupled to the second common node. In the example of FIG. 10, node 228 of first power converter 202 is coupled to second common node 216 and node 232 of second power converter 204 is coupled to second common node 216.

Figure 18:
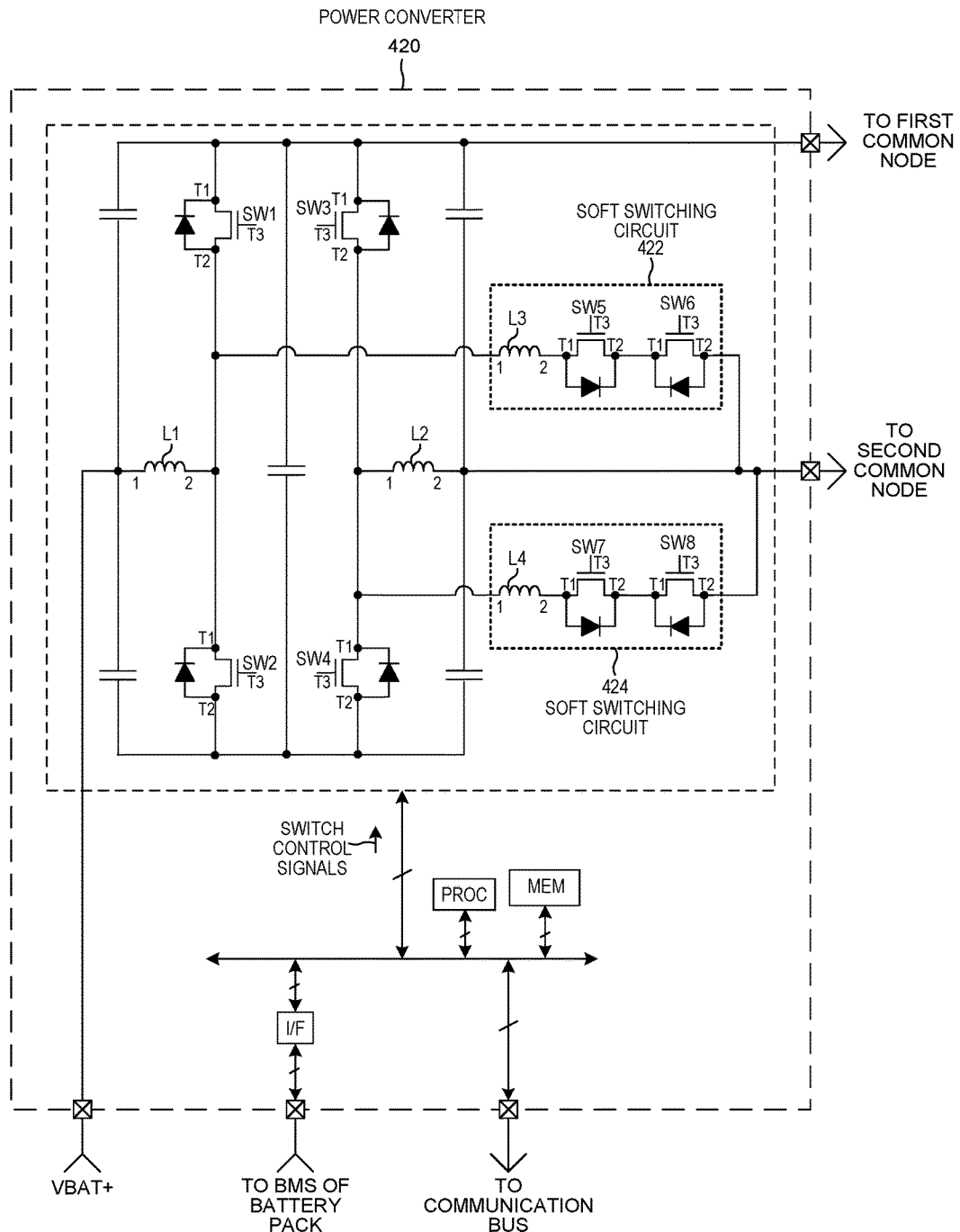
FIG. 18 is a detailed circuit diagram of another embodiment of a power converter 420 that includes soft switching circuitry.

FIG. 18 is a detailed circuit diagram of another embodiment of a power converter 420 that includes soft switching circuitry. Power converter 420 includes similar circuitry as the power converters of system 200 and also includes a first soft switching circuit 422 and a second soft switching circuit 424. The first and second soft switching circuits 422 and 424 reduce the power losses involved in switching switches SW1, SW2, SW3, and SW4. Power converter 420 can be employed in system 200 to achieve increased efficiency and faster switching.

First soft switching circuit 422 is coupled between a second lead of the first inductor L1 and second common node 216. First soft switching circuit 422 comprises inductor L3, switch SW5, and switch SW6. A first lead of inductor L3 is coupled to a second lead of first inductor L1 and a second lead of inductor L3 is coupled to switch SW5. Switch SW5 is coupled between inductor L3 and switch SW6. Switch SW6 is coupled between switch SW5 and second common node 216. Second soft switching circuit 422 is coupled between a first lead of the second inductor L2 and second common node 216. Second soft switching circuit 424 comprises inductor L4, switch SW7, and switch SW8. A first lead of inductor L4 is coupled to a first lead of inductor L2 and a second lead of inductor L4 is coupled to switch SW7. Switch SW7 is coupled between inductor L4 and switch SW8. Switch SW8 is coupled between switch SW7 and second common node 216.

In another embodiment, the second switch SW6/SW8 is omitted from the switching circuitry. The second switch SW6/SW8 provides reverse blocking capability where switches SW5/SW7 are FETs or IGBTs with an intrinsic body diode which allows conduction in the reverse direction. Thus, specific embodiments that do not employ FETs or IGBTs may not require reverse blocking capability and involve soft switching circuitry having only one inductor and one switch. In yet another embodiment, one of the two switching circuits 422 and 424 is omitted such that only one of the two switching circuits shown in FIG. 18 is employed.

Figure 19:
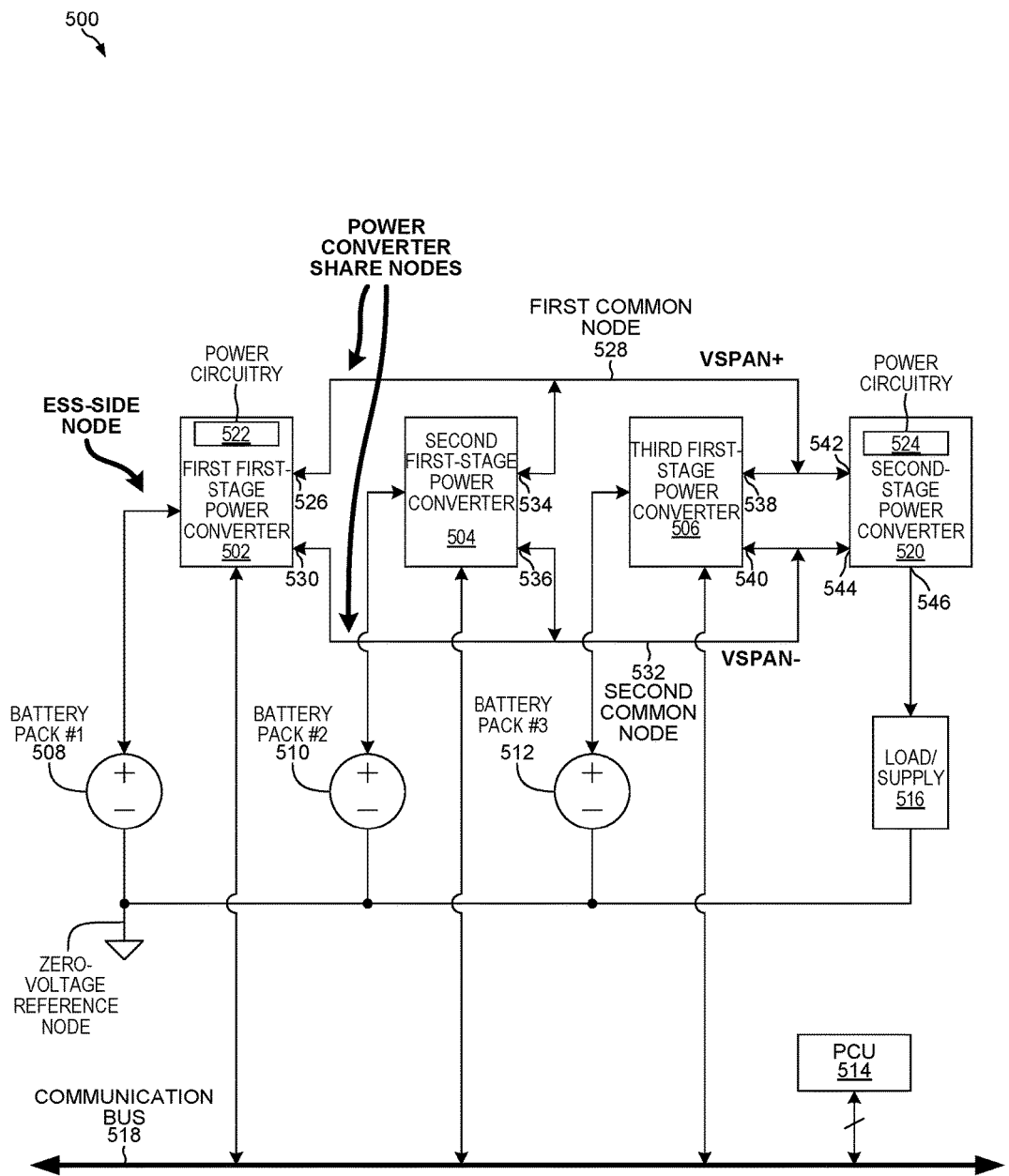
FIG. 19 is a diagram of a system 500 in accordance with another embodiment.

FIG. 19 is a diagram of a system 500 in accordance with another embodiment. System 500 comprises a plurality of first-stage power converters 502, 504, and 506, a plurality of energy storage systems 508, 510, and 512, a power control unit (PCU) 514, a power node 516, a communication bus 518, and a second-stage power converter 520. The PCU 514 communicates with each of the power converters 502, 504, and 506 via the communication bus 518. Each first-stage power converter includes an amount of power circuitry 522. The second-stage power converter includes an amount of power circuitry 524. In this example, the power node 516 is a DC power bus, and each storage system 208, 210, and 212 is a battery pack. Power circuitry 522 of the first-stage power converter and power circuitry 524 of the second-stage power converter 520 together form a two-stage power converter. The first-stage power converters 502, 504, and 506 are also referred to as "battery stage converters". The second-stage power converter 520 is also referred to as a "load stage converter".

The system 500 controls first-stage power converters 502, 504, and 506 and second-stage power converter 520 to regulate power between the battery packs 208, 210, and 212 and first common node 528, second common node 532, and node 516. First first-stage power converter 502 is coupled to first battery pack 508 and has a first node 526 coupled to a first common node 528 and a second node 530 coupled to a second common node 532. Second first-stage power converter 504 is coupled to second battery pack 510 and has a first node 534 coupled to first common node 528 and a second node 536 coupled to the second common node 532. Third first-stage power converter 506 is coupled to third battery pack 212 and has a first node 538 coupled to first common node 528 and a second node 540 coupled to the second common node 532. Second-stage converter 520 has a first node 542 coupled to the first common node 528 and a second node 544 coupled to the second common node 532. A third node 546 of the second-stage power converter 520 is coupled to load or supply 516. Each battery pack 508, 510, and 512 has a terminal coupled to a zero-voltage reference node.

Figure 20:
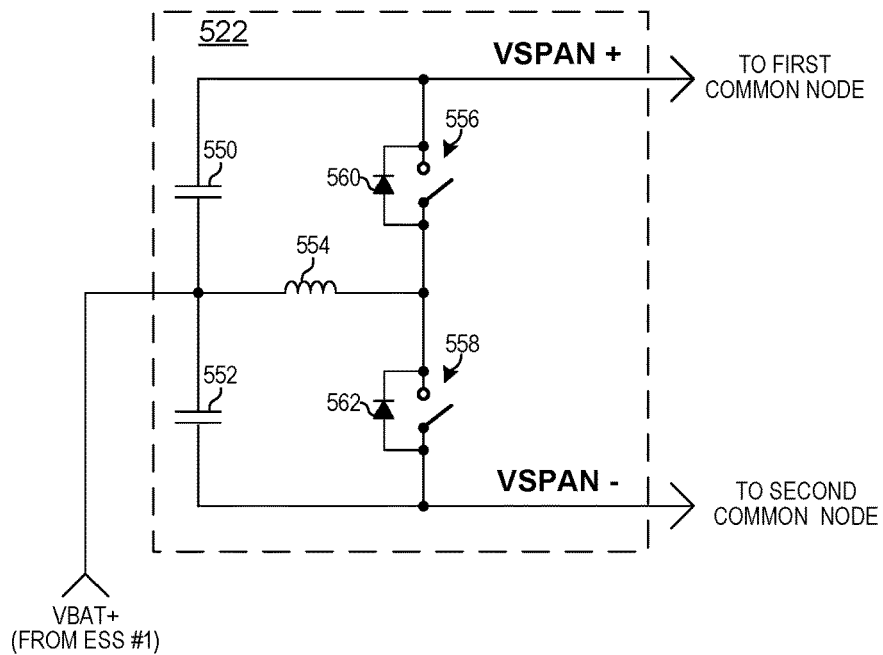
FIG. 20 is a circuit diagram of one embodiment of power circuitry 522 of the first-stage power converters of system 500.

FIG. 20 is a circuit diagram of one embodiment of power circuitry 522 of the first-stage power converters of system 500. Power circuitry 522 comprises capacitors 550 and 552, inductor 554, switches 556 and 558, and parallel connected diodes 560 and 562.

Figure 21:
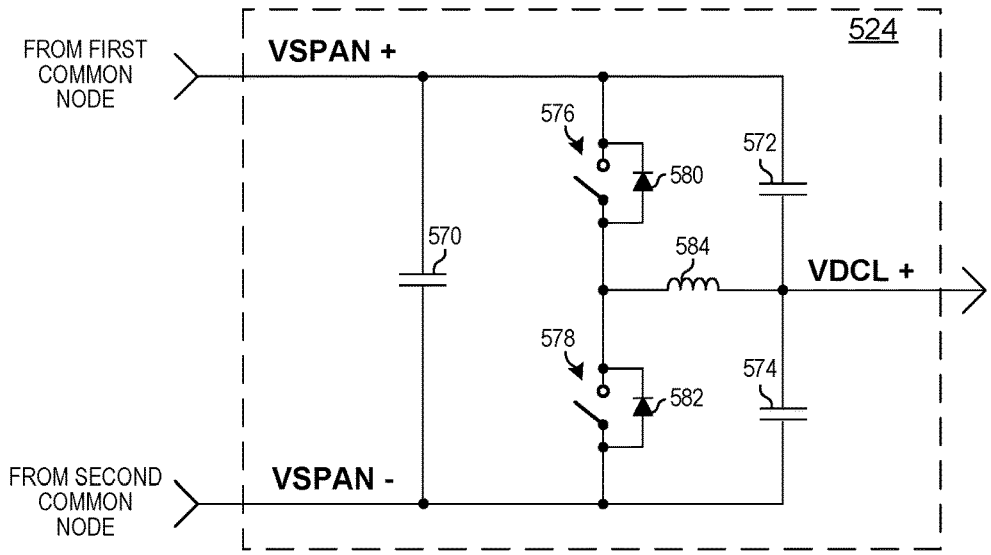
FIG. 21 is a diagram of one embodiment of power circuitry 524 of the second-stage power converter 520 of system 500.

FIG. 21 is a diagram of one embodiment of power circuitry 524 of the second-stage power converter 520 of system 500. Power circuitry 524 comprises a capacitors 570, 572, 574, switches 576 and 578, parallel connected diodes 580 and 582, and inductor 584.

Figure 22:
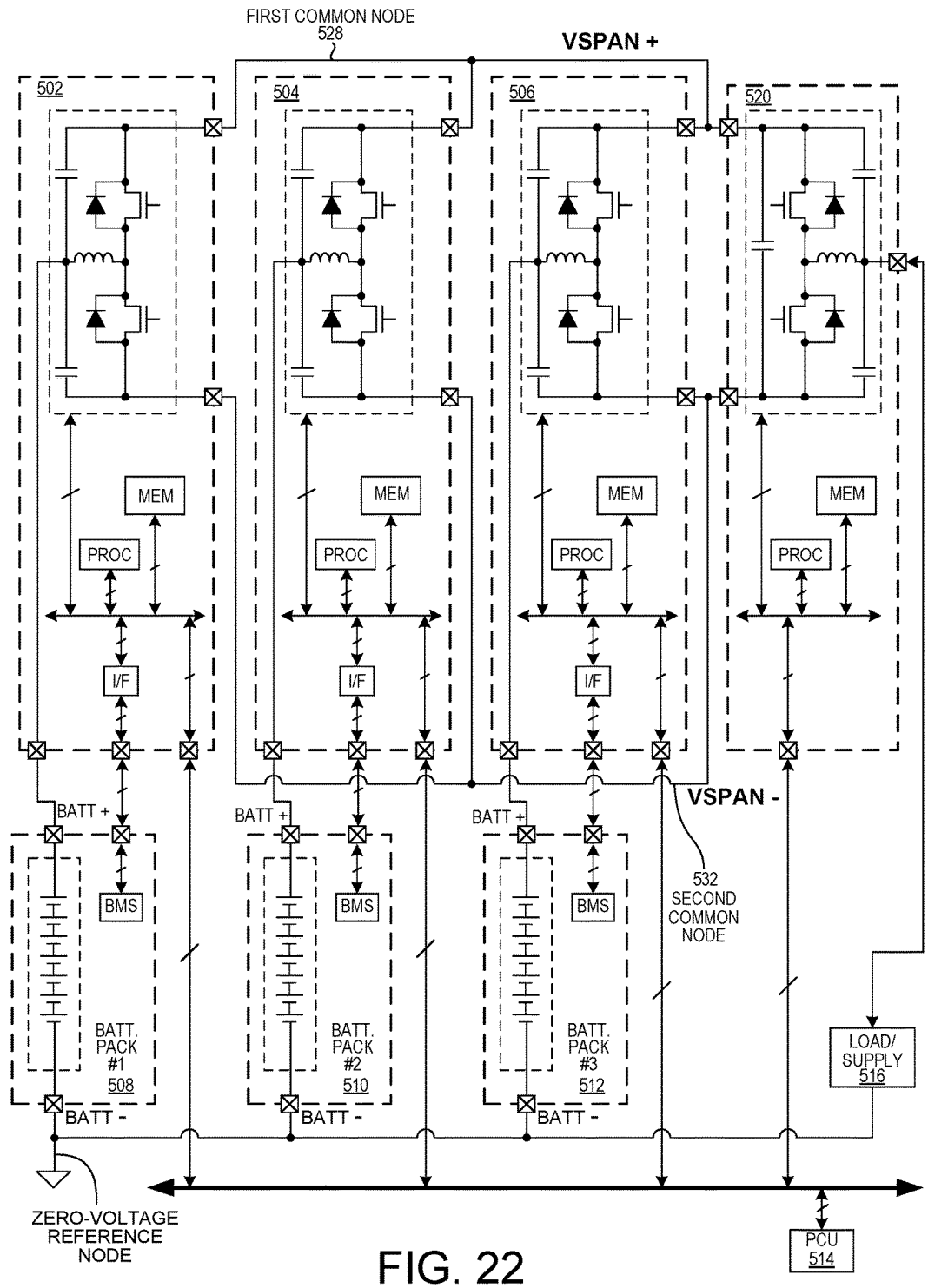
FIG. 22 is a detailed circuit diagram of the system 500.

FIG. 22 is a detailed circuit diagram of the system 500. The system 500 regulates power between the battery packs 208, 210, and 212 such that a positive span voltage is present on the first common node 528 and a negative span voltage is present on the second common node 532. In this example, the mean of the two power converter share nodes is equal to the mean battery voltage.

Figure 23:
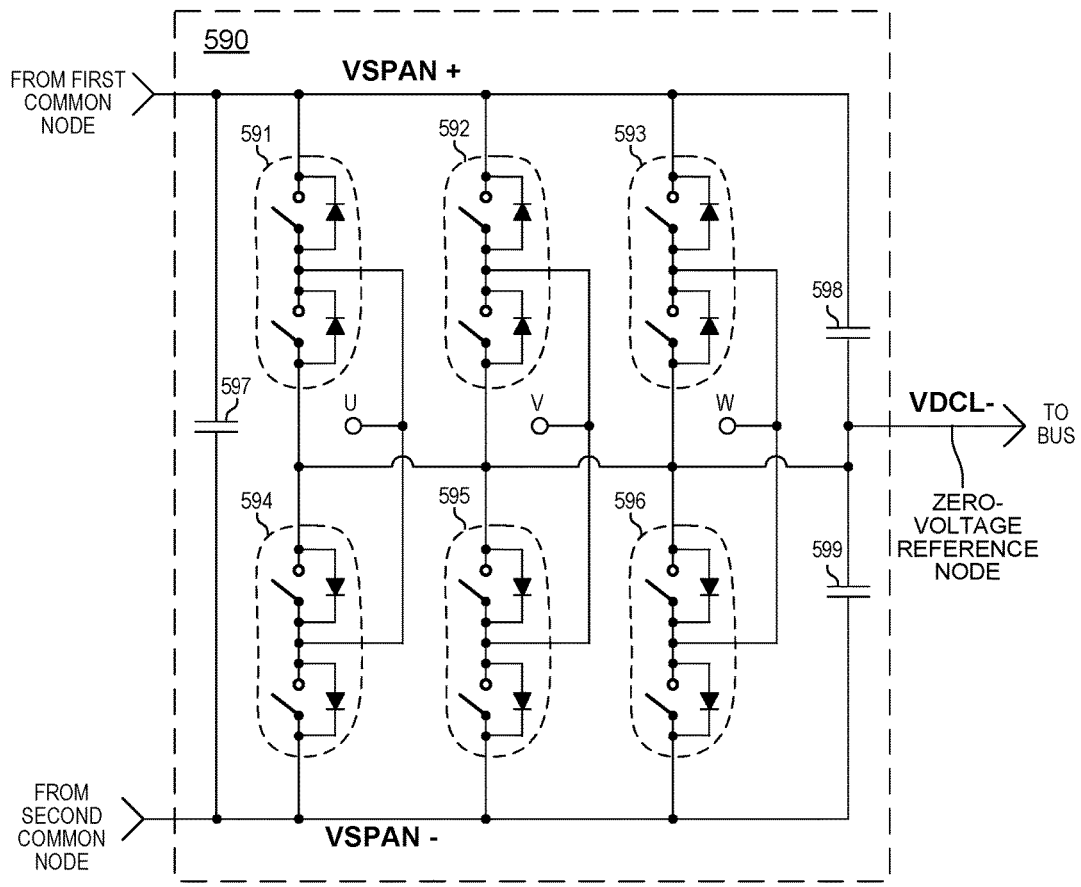
FIG. 23 is another embodiment of power circuitry 590 of the second-stage power converter of system 500.

FIG. 23 is another embodiment of power circuitry 590 of the second-stage power converter of system 500. Power circuitry 590 is operable as a bi-directional inverter having three-phase power nodes, u, v, and w. Power circuitry 590 includes three upper half-bridge pairs 591, 592, 593 which form an upper inverter, and three lower half-bridge pairs 594, 595, 596 that form a lower inverter, and capacitors 597, 598, and 599. System 500 regulates power circuitry 590 such that positive span voltage VSPAN+ is present on first common node 528 and negative span voltage VSPAN− is present on second common node 532. In this example, the mean of the two power converter share nodes is equal to the mean battery voltage.

FIG. 24 is a diagram of another embodiment of the system 200 shown in FIG. 10. System 600 includes a power source 602 that supplies power to each of the power converters.

As a person skilled in the art will recognize from the previous detailed description and from the figures and claims, modifications and changes can be made to the preferred embodiments of the invention without departing from the scope of this invention defined in the following claims.

We claim:

1. A system comprising:
a first energy storage system having a first terminal and a second terminal, wherein the second terminal of the first energy storage system is coupled to a zero-voltage reference node;
a second energy storage system having a first terminal and a second terminal, wherein the second terminal of the second energy storage system is coupled to the zero-voltage reference node;
a first power converter having an ESS-side node and two share nodes, wherein the ESS-side node of the first power converter is coupled to the first terminal of the first energy storage system;
a second power converter having an ESS-side node and two share nodes, wherein the ESS-side node of the second power converter is coupled to the first terminal of the second energy storage system, wherein the first share node of the second power converter is coupled to the first share node of the first power converter, and wherein the second share node of the second power converter is coupled to the second share node of the first power converter; and
a power supply or load connected between at least one share node and the zero-voltage reference node, wherein each of the first power converter and the second power converter is configured to withstand less than a maximum ESS voltage.

2. The system of claim 1, wherein the first energy storage system is a first battery pack, wherein the second energy storage system is a second battery pack, wherein the first power converter has an amount of circuitry configurable to operate as a bi-directional DC-to-DC power converter, wherein the second power converter has an amount of circuitry configurable to operate as a bi-directional DC-to-DC power converter.

3. The system of claim 1 further comprising:
a power control unit configured to control the first and second power converters via a communication bus, wherein the power control unit is operable to control the first power converter to regulate power between the first energy storage system and the power supply or load during a period of time, wherein the first energy storage system outputs a first voltage during the period of time, wherein the power control unit is operable to control the second power converter to regulate power between the second energy storage system and the power supply or load during the period of time, wherein the second energy storage system outputs a second voltage during the period of time, and wherein the second voltage is different from the first voltage.

4. The system of claim 3, wherein the power control unit controls the power converters to regulate the voltage on one or more of the power converter share nodes to be substantially constant during the period of time, and wherein the voltage on one of the power converter share nodes is substantially equivalent to the mean voltage output by all energy storage systems of the system.

5. The system of claim 3, wherein the power control unit controls the power converters to regulate the voltage on both of the power converter share nodes to be substantially constant during the period of time, and wherein the mean voltage of the power converter share nodes is substantially equivalent to the mean voltage output by all energy storage systems of the system.

6. The system of claim 1, wherein the first power converter has one and only one ESS-side node and two and only two share nodes, wherein the second power converter has one and only one ESS-side node and two and only two share nodes, wherein the first power converter is of a same power converter type as the second power converter, and wherein the first power converter has a substantially identical structure to the second power converter.

7. A system comprising:
a first energy storage system having a first terminal and a second terminal, wherein the second terminal of the first energy storage system is coupled to a zero-voltage reference node;
a second energy storage system having a first terminal and a second terminal, wherein the second terminal of the second energy storage system is coupled to the zero-voltage reference node;
a first power converter having an ESS-side node and two share nodes, wherein the ESS-side node of the first power converter is coupled to the first terminal of the first energy storage system;
a second power converter having an ESS-side node and two share nodes, wherein the ESS-side node of the second power converter is coupled to the first terminal of the second energy storage system, wherein the first share node of the second power converter is coupled to the first share node of the first power converter, and wherein the second share node of the second power converter is coupled to the second share node of the first power converter; and
a power supply or load connected between at least one share node and the zero-voltage reference node, wherein the first power converter has an amount of power circuitry, and wherein the power circuitry comprises:
a first switch SW1 having a first terminal T1, a second terminal T2, and a third terminal T3;
a second switch SW2 having a first terminal T1, a second terminal T2, and a third terminal T3;
a third switch SW3 having a first terminal T1, a second terminal T2, and a third terminal T3;
a fourth switch SW4 having a first terminal T1, a second terminal T2, and a third terminal T3;
a first inductor L1 having a first lead and a second lead, wherein the first lead of the first inductor L1 is coupled to the first terminal of the first energy storage system, wherein the second lead of the first inductor L1 is coupled to the second terminal T2 of the first switch SW1, and wherein the second lead of the first inductor L1 is also coupled to the first terminal T1 of the second switch SW2; and
a second inductor L2 having a first lead and a second lead, wherein the first lead of the second inductor L2 is coupled to the second terminal T2 of the third switch SW3, wherein the first lead of the second inductor L2 is also coupled to the first terminal T1 of the fourth switch SW4, and wherein the second lead of the second inductor L2 is coupled to a share node.

8. The system of claim 7, further comprising:
a capacitor having a first lead and a second lead, wherein the first lead of the capacitor is coupled to the first terminal of the first switch SW1, wherein the first lead of the capacitor is also coupled to the first terminal of the third switch SW3, wherein the second lead of the capacitor is coupled to the second terminal of the second switch SW2, and wherein the second lead of the capacitor is also coupled to the second terminal of the fourth switch SW4.

9. The system of claim 7, wherein the first terminal of the first switch SW1 is capacitively coupled to the first lead of the first inductor L1, wherein the second terminal of the second switch SW2 is capacitively coupled to the first lead of the first inductor L1, wherein the first terminal of the third switch SW3 is capacitively coupled to the second lead of the second inductor L2, and wherein the second terminal of the fourth switch SW4 is capacitively coupled to the second lead of the second inductor L2.

10. The system of claim 7, further comprising:
a switching circuit that is coupled between the second lead of the first inductor L1 and one of the power converter nodes, wherein the switching circuit comprises:
a third inductor L3 having a first lead and a second lead, wherein the first lead of the third inductor L3 is coupled to the second lead of the first inductor L1; and
a fifth switch SW5 having a first terminal T1, a second terminal T2, and a third terminal T3, wherein the second lead of the third inductor L3 is coupled to the first terminal T1 of the fifth switch SW5, wherein the second terminal T2 of the fifth switch SW5 is coupled to a power converter node.

11. The system of claim 7, further comprising:
a switching circuit that is coupled between the first lead of the second inductor L2 and one of the power converter nodes, wherein the switching circuit comprises:
an inductor L4 having a first lead and a second lead, wherein the first lead of the inductor L4 is coupled to the first lead of the second inductor L2;
a switch SW7 having a first terminal T1, a second terminal T2, and a third terminal T3, wherein the second lead of the inductor L4 is coupled to the first terminal T1 of the switch SW7, wherein the second terminal T2 of the switch SW7 is coupled to a power converter node.

12. The system of claim 1, wherein the system is a power system of an electric vehicle, and wherein the power supply or load comprises at least one power component taken from the group consisting of: an electric motor, an inverter, an HVAC system, DC-to-DC converter, and a vehicle charger.

13. A method comprising:
(a) coupling a first share node of a first power converter to a first share node of a second power converter, wherein the first power converter is of a power converter type, wherein the second power converter is of the power converter type, wherein first power converter is adapted to be coupled to a first energy storage system, and wherein second power converter is adapted to be coupled to a second energy storage system; and
(b) coupling a second share node of the first power converter to a power supply or load and coupling a second share node of the second power converter to the power supply or load, wherein neither the first power converter nor second power converter is configured to handle more than two times a maximum deviation between output voltages of the first energy storage system and the second energy storage system.

14. The method of claim 13, further comprising:
(c) causing energy stored in the first energy storage system and second energy storage system to be transferred to the power load for a duration of time, wherein during the duration of time, the first energy storage system has a first voltage and the second energy storage system has a second voltage different from the first voltage.

15. The method of claim 13, further comprising:
(c) causing energy from the power supply to be transferred to the first energy storage system and second energy storage system for a duration of time, wherein during the duration of time, the first energy storage system has a first voltage and the second energy storage system has a second voltage different from the first voltage.

16. The method of claim 13, further comprising:
(c) causing energy stored in the first energy storage system to be transferred to the second energy storage system.

17. The method of claim 13, wherein the supply or load of (b) includes a second-stage power converter.

18. The method of claim 13, wherein the first power converter has a single node for connection to an energy storage system, wherein the first power converter has only two share nodes, wherein the second power converter has a single node for connection to an energy storage system, and wherein the second power converter has only two share nodes.

19. The method of claim 13, A method comprising:
(a) coupling a first share node of a first power converter to a first share node of a second power converter, wherein the first power converter is of a power converter type, wherein the second power converter is of the Power converter type, wherein first power converter is adapted to be coupled to a first energy storage system, and wherein second power converter is adapted to be coupled to a second energy storage system; and
(b) coupling a second share node of the first power converter to a Power supply or load and coupling a second share node of the second Power converter to the power supply or load, wherein the first power converter has an amount of power circuitry, and wherein the power circuitry comprises:
a first switch SW1 having a first terminal T1, a second terminal T2, and a third terminal T3;
a second switch SW2 having a first terminal T1, a second terminal T2, and a third terminal T3;
a third switch SW3 having a first terminal T1, a second terminal T2, and a third terminal T3;
a fourth switch SW4 having a first terminal T1, a second terminal T2, and a third terminal T3;
a first inductor L1 having a first lead and a second lead, wherein the first lead of the first inductor L1 is coupled to the first terminal of the first energy storage system, wherein the second lead of the first inductor L1 is coupled to the second terminal T2 of the first switch SW1, and wherein the second lead of the first inductor L1 is also coupled to the first terminal T1 of the second switch SW2; and
a second inductor L2 having a first lead and a second lead, wherein the first lead of the second inductor L2 is coupled to the second terminal T2 of the third switch SW3, wherein the first lead of the second inductor L2 is also coupled to the first terminal T1 of the fourth switch SW4, and wherein the second lead of the second inductor L2 is coupled to a share node.

20. The method of claim 19, further comprising:
a capacitor having a first lead and a second lead, wherein the first lead of the capacitor is coupled to the first terminal of the first switch SW1, wherein the first lead of the capacitor is also coupled to the first terminal of the third switch SW3, wherein the second lead of the capacitor is coupled to the second terminal of the second switch SW2, and wherein the second lead of the capacitor is also coupled to the second terminal of the fourth switch SW4.

21. A system comprising:
a power supply or load connected between at least one power converter share node and a zero-voltage reference node; and
means for regulating the power supply or load connected to one of the power converter share nodes, wherein the means is also for receiving a current from another of the power converter share nodes, and wherein no voltage between two power converter share nodes exceeds half of a maximum ESS voltage of the system.

22. The system of claim 21, wherein the means is a power converter having a ESS-side node coupled to an energy storage system, and wherein the power converter is coupled to each of the power converter share nodes.

23. The system of claim 21, wherein a voltage VSPAN+ is present on one of the power converter share nodes, and wherein the voltage VSPAN+ is equal to or greater than a maximum energy storage system voltage.

24. The system of claim 21, wherein a voltage VSPAN− is present on one of the power converter share nodes, and wherein the voltage VSPAN− is equal to or less than a minimum energy storage system voltage.

25. The system of claim 21, wherein a mean of voltages present on the power converter share nodes is equal to a mean energy storage system voltage.

26. The system of claim 21, wherein a voltage present on one of the power converter share nodes is equal to a mean energy storage system voltage.

* * * * *

UNITED STATES PATENT AND TRADEMARK OFFICE
CERTIFICATE OF CORRECTION

PATENT NO. : 10,457,159 B1
APPLICATION NO. : 15/250906
DATED : October 29, 2019
INVENTOR(S) : Jim Castelaz, Elias Stein and William Treichler Page 1 of 1

It is certified that error appears in the above-identified patent and that said Letters Patent is hereby corrected as shown below:

In the Claims

Column 26, Line 34, Claim 19 cancel the text "The method of claim 13,".

Signed and Sealed this
Third Day of November, 2020

Andrei Iancu
*Director of the United States Patent and Trademark Office*